US011616553B1

(12) United States Patent
Kachroo et al.

(10) Patent No.: US 11,616,553 B1
(45) Date of Patent: Mar. 28, 2023

(54) CHANNEL STATE INFORMATION (CSI) SENSING IN THE 2.4 GHZ BAND

(71) Applicant: Amazon Technologies, Inc., Seattle, WA (US)

(72) Inventors: Amit Kachroo, San Jose, CA (US); Durga Laxmi Narayana Swamy Inti, San Jose, CA (US); Ravi Ichapurapu, Morgan Hill, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/590,661

(22) Filed: Feb. 1, 2022

(51) Int. Cl.
*H04B 7/06* (2006.01)
*H04L 5/00* (2006.01)

(52) U.S. Cl.
CPC ......... *H04B 7/0626* (2013.01); *H04B 7/0639* (2013.01); *H04L 5/0062* (2013.01); *H04L 5/0098* (2013.01)

(58) Field of Classification Search
CPC .... H04B 7/0626; H04L 5/0062; H04L 5/0098
See application file for complete search history.

(56) References Cited

U.S. PATENT DOCUMENTS

| | | | | |
|---|---|---|---|---|
| 10,305,766 B1 * | 5/2019 | Zhang | .................. | H04B 17/318 |
| 10,673,506 B1 * | 6/2020 | Dash | .................... | H04B 7/0626 |
| 2017/0212210 A1 * | 7/2017 | Chen | ......................... | G01S 5/06 |
| 2020/0259541 A1 * | 8/2020 | Dash | ...................... | H04W 24/02 |
| 2022/0005337 A1 * | 1/2022 | Shin | ...................... | H04L 5/0055 |
| 2022/0329330 A1 * | 10/2022 | Merlin | .................. | H04W 4/025 |

\* cited by examiner

*Primary Examiner* — Jaison Joseph
(74) *Attorney, Agent, or Firm* — Lowenstein Sandler LLP

(57) ABSTRACT

Technologies directed to channel state information (CSI) sending in the 2.4 GHz band are described. A method includes receiving first CSI data representing channel properties of a wireless channel used by first and wireless devices that operates in the 2.4 GHz band. The method generates CSI samples at a first sampling rate. If the method determines that a first value, representing quality of the CSI samples, satisfies a threshold criterion, the method generates second CIS samples at a second higher sampling rate while alternating between each of multiple wireless channels in the specified amount of time. The method determines a score for each channel subcarrier index of a set of channel subcarrier indexes using the second CSI samples and identifies a subset based on the score. Using the second CSI samples corresponding to the subset, the method determines a motion condition or a no-motion condition within a geographical region.

20 Claims, 18 Drawing Sheets

| Decision Results / Ground Truth | Motion | No Motion |
|---|---|---|
| Motion | True Negative (TN)<br>- TN is detected with high confidence. | False Positive (FP)<br>- FP of WiFi detection may be reduced through presence confirmation with other sensing technique (ultrasound or acoustics). |
| No Motion | False Negative (FN)<br>- FN may be reduced by analyzing a few samples over a longer time window, instead of making decision for each sample. | True Positive (TP)<br>- TP is detected with high confidence. |

CHANNEL STATE INFORMATION (CSI) SENSING IN THE 2.4 GHZ BAND

BACKGROUND

Many buildings, such as homes, retail stores, business centers, and the like, have a growing number of wireless transmission devices, including wireless transmitters and wireless receivers. These devices are sending an increasing amount of radio frequency (RF) energy through the buildings from many different directions. Wireless RF signals may be used in motion detectors to help detect human presence.

BRIEF DESCRIPTION OF DRAWINGS

The present embodiments will be understood more fully from the detailed description given below and from the accompanying drawings of various embodiments of the present disclosure, which, however, should not be taken to limit the present disclosure to the specific embodiments, but are for explanation and understanding only.

FIG. 4D is a decision-mapping table to indicate disclosed solutions to the possibility of false-positive or false-negative presence detections, according to various embodiments.

DETAILED DESCRIPTION

Figure 1A:
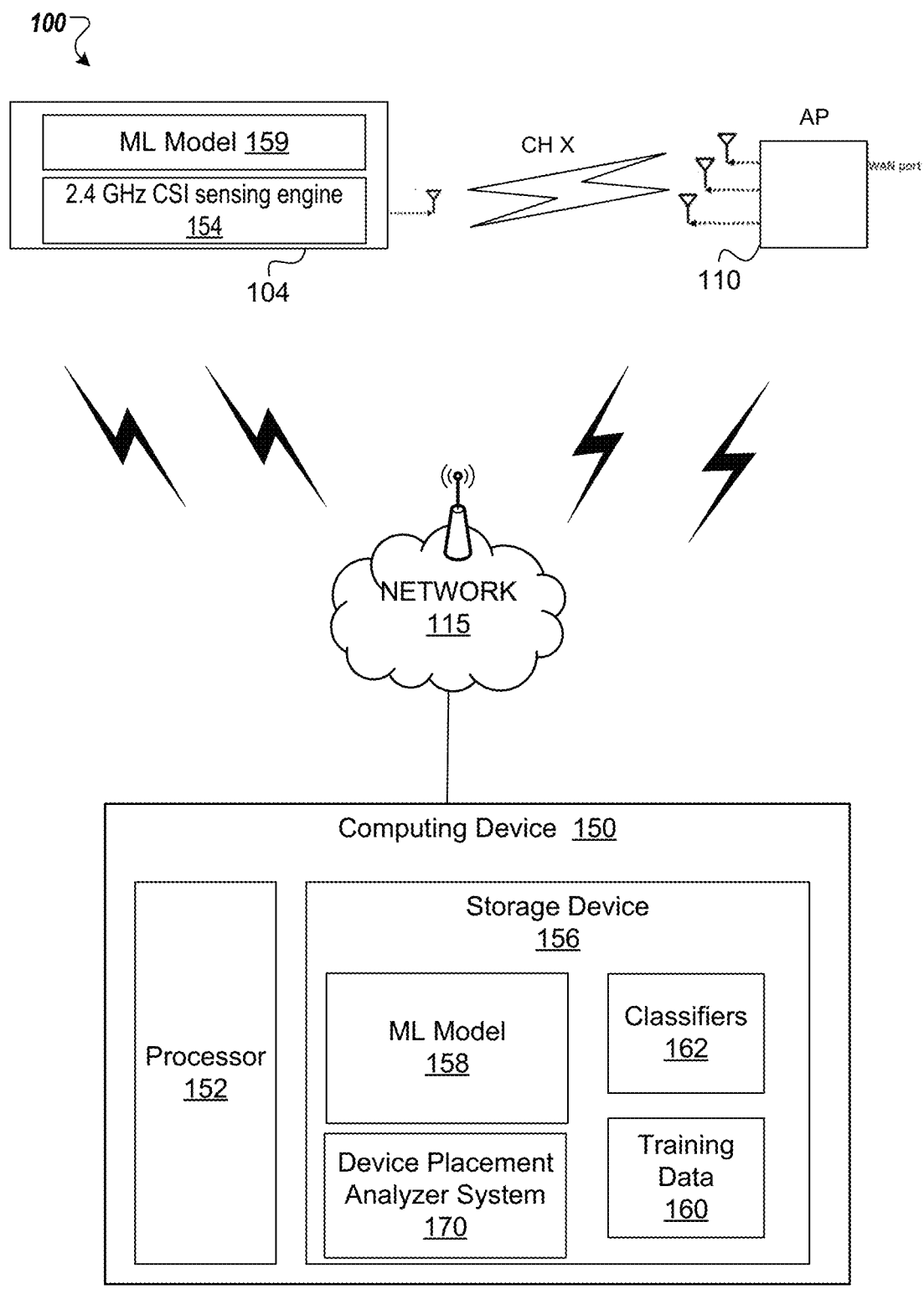
FIG. 1A is a block diagram of a system including a wireless detector with a 2.4 GHz CSI sensing engine for improving CSI-based detection of a human using wireless signals in a wireless local area network in the 2.4 GHz band, according to at least one embodiment.

A motion detector (e.g., a wireless detector) is a wireless device that detects moving objects, particularly humans. A motion detector may be integrated as a component of a system that automatically performs a task or alerts a user of motion in an area or vicinity. Accordingly, motion detectors may form a security component, such as a burglar alarm system, automated lighting control, home control, energy efficiency, and other useful systems.

The presence detection performed by motion detectors may be based on a number of different possible technologies, including, for example, passive infrared (PIR), microwave, ultrasonic, tomographic, video camera software, and gesture detection. A tomographic motion detector may sense disturbances to radio waves that pass from node to node in a mesh network. More generally, wireless radio frequency (RF) signals (or simply "wireless signals") may be employed to not only detect presence within line of sight, such as in the same room or space, but also in the adjacent room(s) because wireless signals may pass through walls. These RF signals may be generated via a WLAN employing technology such as 2.4 GHz or 5.0 GHz Wi-Fi®, Bluetooth®, ZigBee®, Zwave® and the like. The use of wireless signals for presence detection may be an attractive option due to the ubiquity of wireless transceivers such as access points (AP) or base station devices present in so many buildings and homes.

Furthermore, the RF channel properties available through radio transmission channels may contain data that may be employed in machine learning techniques used to train, for example, a supervised machine learning (ML) model for presence classification. Examples of data that may carry RF channel properties include Received Signal Strength Indicator (RSSI) data, Channel State Information (CSI) data, or a combination of both, as will be discussed in more detail. Additional sources of signal characteristics, power, channel properties, or other channel information may also be employed, and therefore, RSSI and CSI are but a listing of understood and available forms of channel properties. RSSI is a measurement value of power present in received wireless signals, and contains a single value per packet. For example, RSSI can be measured as the radio frequency power level that a client device receives from an access point, such as a wireless router. RSSI may be a measurement of the energy observed at the antenna by a wireless physical layer (PHY) of the receiver used to receive a current Physical Layer Convergence Protocol (PLCP) Protocol Data Unit (PPDU) of the receiver. In a typical home WLAN, the client device generates the RSSI either based on the data frame received or the beacon from the AP. The RSSI fluctuates when the environment changes. Many factors can cause such changes: moving transmitter or receiver, moving objects nearby the AP or client, changing ambient noise level, etc. As opposed to the RSSI, a single value available per packet, the CSI data includes the detailed channel impulse response with both amplitude and phase information across all the Orthogonal frequency-division multiplexing (OFDM) subcarriers and is updated (at the maximum rate) every OFDM symbol. This provides more information about the environment under surveillance. Therefore, by using CSI data, better detection can be accomplished. For example, CSI data can distinguish a person is watching TV or washing dishes. However, RSSI based method is not able to distinguish them.

CSI data is granular, real-time data on the amplitude and phase of each channel subcarrier between the WLAN transmitter and receiver. Raw CSI data, provided by the chipset, is fed to a signal-processing engine for noise reduction, signal transforms, and/or signal extraction. The current implementations take these processed CSI data and run it through a machine learning (ML) model to determine whether the environment has been disrupted to the point of perceiving motion. This ML model can be "tuned" to prioritize latency, accuracy/sensitivity, using hysteresis or applying a user-provided notification threshold.

CSI-based motion detectors do not require an "active transmitter" like a phone to be on a person in order to detect and track them. Rather, CSI-based motion detectors work based on disruption to the channel state information and multipath effects of WLAN transmission between APs, smart speakers, streaming devices, or the like. However, conventional solutions use dedicated networks or mesh networks for CSI package exchanges in the 5 GHz band to increase the range. However, some client devices depend on the AP for which operating band is selected (e.g., 2.4 or 5 GHz) and what bandwidth is supported. Some client devices only support 2.4 GHz for cost and power consumption reasons. CSI-based motion detection in the 2.4 GHz band has three issues that affect CSI performance, including bandwidth limitations (e.g., 20 MHz bandwidth), interference, and congestion.

Aspects of the present disclosure can overcome these challenges and others by providing technology that increases a sampling rate to mitigate the impact of interference and congestion, provides channel diversity with smart channel switching and time division, and provides interference mitigation to facilitate CSI-based detection in the 2.4 GHz band. Aspects of the present disclosure can allow CSI-based motion detection in the 2.4 GHz band by a first process that performs smart channel switching and time division between multiple channels in the same period of time, effectively increasing the sampling rate. Aspects of the present disclosure can allow CSI-based motion detection in the 2.4 GHz band by a second process that provides interference mitigation. For interference mitigation, the second process obtains samples when an adjacent channel interference (ACI) filter is activated and samples when the ACI filter is de-activated. The second process uses a Cramer-von Mises criterion between the two sample sets to statistically rank the channel subcarrier indexes. The top-ranked indexes provide the best data for CSI-based motion detection despite the congestion and interference in the 2.4 GHz band.

One method includes receiving first CSI data representing channel properties of a wireless channel used by a first wireless device and a second wireless device that operates in a 2.4 GHz band. The method generates a first set of CSI samples by sampling the first CSI data at a first sampling rate corresponding to a specified amount of time. The method determines that a first value, representing a quality metric of the first set of CSI samples, satisfies a first threshold criterion. In response, the method receives second CSI data representing channel properties of multiple wireless channels (e.g., 3 channels) between the first wireless device and the second wireless device. The method generates a second set of CSI samples by sampling the second CSI data at a second sampling rate higher than the first sampling rate while alternating between each of the multiple wireless channels in the specified amount of time. The second CSI data is collected as the method switches between the multiple wireless channels in a specified amount of time, effectively increasing a sampling rate, and providing channel diversity. The method determines a score for each channel subcarrier index of a set of channel subcarrier indexes using the second set of CSI samples and identifies a subset of channel subcarrier indexes from the set of channel subcarrier based on the score. For example, the subset can include indexes with the three highest scores or the five highest scores. In some cases, the lower score is better. The subset can include indexes with the three lowest scores or the five lowest scores in these cases. The method determines a motion condition or a no-motion condition within a geographical region using the CSI samples corresponding to the subset of channel subcarrier indexes. The geographical region can be a room within a home, multiple rooms within the home, an office, a room in a building, multiple rooms in the building, an outdoor region, or the like.

The channel properties may be present in data received within a communication link between the wireless detector, e.g., a first wireless device, and a wireless transmitter in an AP-type device, e.g., a second wireless device. The wireless detector may classify, by a processor of the wireless detector executing a supervised ML model, the first data to distinguish human movement within the building from stationary objects, to detect the presence, motion, or no-motion of a human. The wireless detector may then output a signal indicative of the confirmed presence, motion, or no-motion of the human in the room of the building. The output signal may be adapted to turn off the lights, signal a security system, or adjust a thermostat associated with the room in the building.

FIG. 1A is a block diagram of a system 100 including a wireless detector 104 with a 2.4 GHz CSI sensing engine 154 for improving CSI-based detection of a human using wireless signals in a wireless local area network in the 2.4 GHz band, according to at least one embodiment. The system 100 may include a wireless detector 104 with a 2.4 GHz CSI sensing engine 154, at least one access point device 110 that includes a transmitter of wireless signals, a network 115 (e.g., WLAN, a wide area network (WAN), or cellular), and a computing device 150. The wireless detector 104, which may be a WLAN receiver, may be located in a room (or other space) in or near a building in order to detect presence associated with the room (or other space). The access point device 110, which may be a WLAN transmitter, may transmit wirelessly over multiple channels, at least one of which is received by a receiver within the wireless detector 104. The access point device 110 may be in the same or a different room than the wireless detector 104. In at least one embodiment, the wireless detector 104 includes the 2.4 GHz CSI sensing engine 154 that collects and processes CSI data as described in detail below to be input into a machine learning (ML) model 159 to make an inference of a motion or a no-motion condition within a geographic region surrounding the wireless detector 104. In another embodiment, the 2.4 GHz CSI sensing engine 154 that collects and processes CSI data so that not all of the CSI data needs to be stored or transmitted to the computing device 150. Rather, the 2.4 GHz CSI sensing engine 154 can collect and process the CSI data so that only the CSI data that helps infer motion or no-motion conditions is stored or transmitted to the computing device 150. This can help reduce power consumption by the wireless detector 104, reduce memory requirements, or the like.

In various embodiments, the wireless detector 104 may receive first data indicative of channel properties of a communication link between the wireless detector 104 and the access point device 110. The wireless detector 104 (or some remote device to which the first data is transmitted) may classify the first data to determine whether a human presence has been detected. This classification, as mentioned, may be performed using a trained supervised machine learning (ML) model, such as a support vector machine (SVM) model, a neural network (NN) model, or another trained ML model.

The computing device 150, located in the cloud across the network 115, may perform the initial training of a supervised ML model 158 and provide a device placement analyzer system 170 for placing devices to optimize detecting the presence of a human using wireless signals in a wireless local area network. In at least one embodiment, the supervised ML model 158 is the same as the ML model 159 at the wireless detector 104. In other embodiments, different models can be used for the supervised ML model 158 and the ML model 159. In another embodiment, the ML model 159 is a sub-model of the supervised ML model 158. In another embodiment, the ML model 159 is one or more layers of the supervised ML model 158 that are deployed on the wireless detector 104. The computing device 150 may include, for example, a processor 152 and storage device 156. The storage device 156, which may be understood to include computer memory and/or storage, may include a supervised ML model 158 (e.g., code for execution of the supervised ML model), device placement analyzer system 170, training data 160, and pre-trained classifiers 162, which may be used in performing detection and location identification of persons within buildings. The pre-trained classifiers 162 may be hundreds or even thousands of classifiers of types of objects expected to be found in rooms of the building, such as furniture, built-in buildings, plants, indoor trees, moving items (both animate and inanimate, including pets), and different sizes and shapes of humans and those humans moving in different ways. In one embodiment, a classifier for a human may be trained to recognize the human movement as distinguished from the movement of pets or curtains.

The training data 160 may later be updated over time as people come and go through the room, and the data captured at the wireless detector 104 (and at other wireless detectors and receivers) within the building may include additional data, including channel properties, captured during periods of time in which the room may change, and particularly with reference to detecting people moving within the room. This updated training data may then be used to train the pre-trained classifiers 162 further, so that further presence detection may be improved. For example, an updated supervised ML model 158 may be transmitted periodically by the computing device 150 to the wireless detector 104 (or to a remote second device) used to perform classification to determine the human presence in the future.

Employing trained ML models to perform presence detection may be performed on different types of channel property data, including Received Signal Strength Indicator (RSSI) data, Channel State Information (CSI), or a combination of both. Additional sources of signal characteristics, power, channel properties, or other channel information may also be employed, and therefore, RSSI and CSI are but a listing of understood and available forms of channel properties.

Accordingly, in one embodiment, the wireless detector 104 may receive and transmit RSSI, which is a parameter (e.g., channel properties) that has a value of zero ("0") to an RSSI maximum value (referred to as "RSSI Max"), and is indicative of the signal strength of a wireless signal associated with a wireless network. Accordingly, RSSI is a measurement value of power present in received wireless signals, and contains a single value per packet. For example, RSSI can be measured as the radio frequency power level that a client device receives from an access point, such as a wireless router. In another implementation, RSSI may be a measurement of the energy observed at the antenna by a wireless PHY of the receiver used to receive a current PPDU of the receiver. For example, in one implementation of a home WLAN (e.g., using the WiFi® technology), the wireless detector 104 may generate the RSSI either based on a data frame received or a beacon from an AP node. The RSSI may fluctuate when the environment changes. Such changes can be caused by many factors, such as moving a transmitter or receiver, moving objects nearby the AP or client, a change in ambient noise level, temperature swings, or other such factors that cause fluctuations in RSSI.

In another embodiment or implementation, the wireless detector 104 may measure and transmit CSI, which is data that includes channel properties of a communication link between a transmitter and a receiver. For example, a receiver within the wireless detector 104 may retrieve the CSI from a baseband channel estimator with which to perform presence detection. The receiver may adjust the rate of sampling channel properties by the baseband channel estimator. The CSI may include a detailed channel impulse response with both amplitude and phase information across all the OFDM subcarriers and be updated (at the maximum rate) every OFDM symbol. This may provide more information about the environment under surveillance, and thus may improve detection capability when applying a trained ML model, as discussed herein, to CSI data or CSI-liked data.

As described above, CSI-based motion detectors work based on disruption to the channel state information and multipath effects of WLAN transmission between APs, smart speakers, streaming devices, or the like. However, conventional solutions use dedicated networks or mesh networks for CSI package exchanges in the 5 GHz band to increase the range. However, some client devices depend on the AP for which operating band is selected (e.g., 2.4 or 5 GHz) and what bandwidth is supported. Some client devices only support 2.4 GHz for cost and power consumption reasons. CSI-based motion detection in the 2.4 GHz band has three issues that affect CSI performance, including bandwidth limitations (e.g., 20 MHz bandwidth), interference, and congestion. The 2.4 GHz CSI sensing engine 154 can overcome these challenges and others by providing technology that increases a sampling rate to mitigate the impact of interference and congestion, provides channel diversity with smart channel switching and time division, and provides interference mitigation to facilitate CSI-based detection in the 2.4 GHz band. Additional details of the 2.4 GHz CSI sensing engine 154 are described below with respect to FIGS. 1B-5K.

Figure 1B:
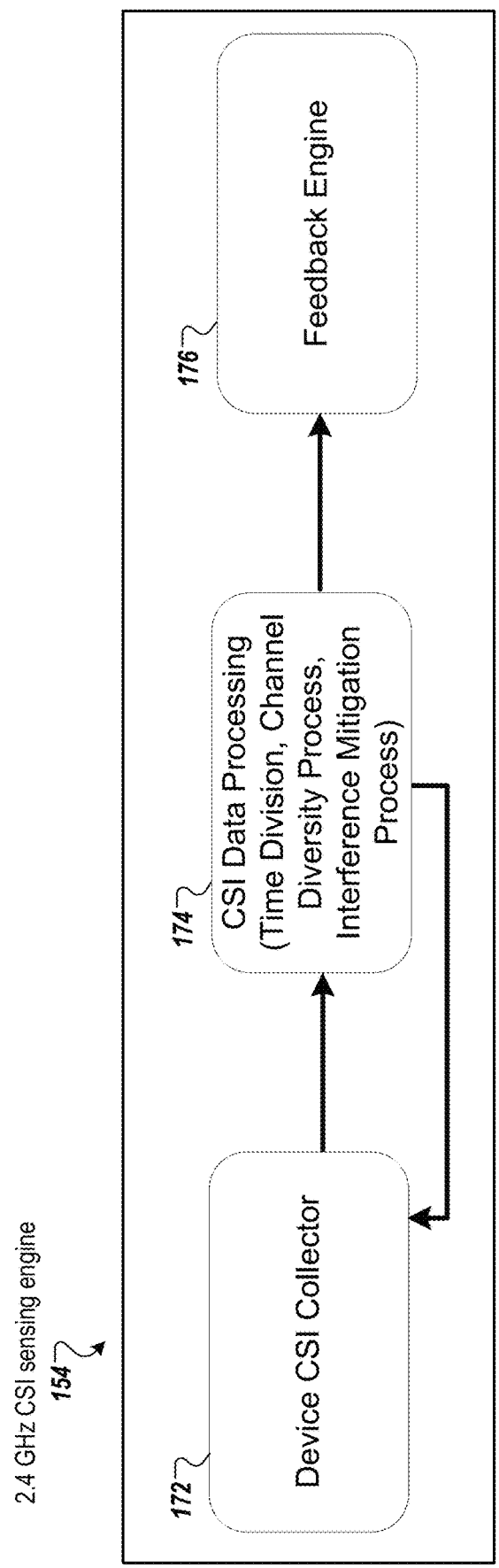
FIG. 1B is a block diagram of a 2.4 GHz CSI sensing engine, according to at least one embodiment.

FIG. 1B is a block diagram of a 2.4 GHz CSI sensing engine 154, according to at least one embodiment. The 2.4 GHz CSI sensing engine 154 for CSI-based sensing includes three main software components: device CSI collector 172, CSI data processing 174, including a time-division, channel diversity process, and an interference mitigation process, and feedback engine 176. The device CSI collector 172 collects data from one or more devices in a WLAN network, and 2.4 GHz CSI sensing engine 154 can be used to identify a subset of the CSI data that is least impacted by interference and congestion in the 2.4 GHz frequency band to optimize the performance of the CSI-based detection. Based on the decision made by CSI data processing 174, the feedback engine 176 can update a database of wireless channels to be used for the time-division, channel diversity process, or other processes. The 2.4 GHz CSI sensing engine 154 can be used in connection with a mobile application that prompts a user for information to improve the performance of the CSI-based detection. For example, the mobile application can provide a user interface to allow the user to input "motion" or "no motion" ground truth information for the CSI data processing 174, such as illustrated in the decision-mapping table 480 of FIG. 4D.

The device CSI collector 172 can collect RF channel properties (e.g., CSI) of a communication link between the wireless detector 104 and the access point device 110. The device CSI collector 172 can collect RF channel properties of one or more channels between one or more devices in the WLAN. The device CSI collector 172 can receive the RSSIs, CSI data, or the like from the RF front-end or a WLAN module that collects this data, as described below with respect to FIG. 1C, or from another wireless device. That is, one wireless device can collect the CSI data, and the CSI data can be provided to another device for CSI data processing.

Figure 1C:
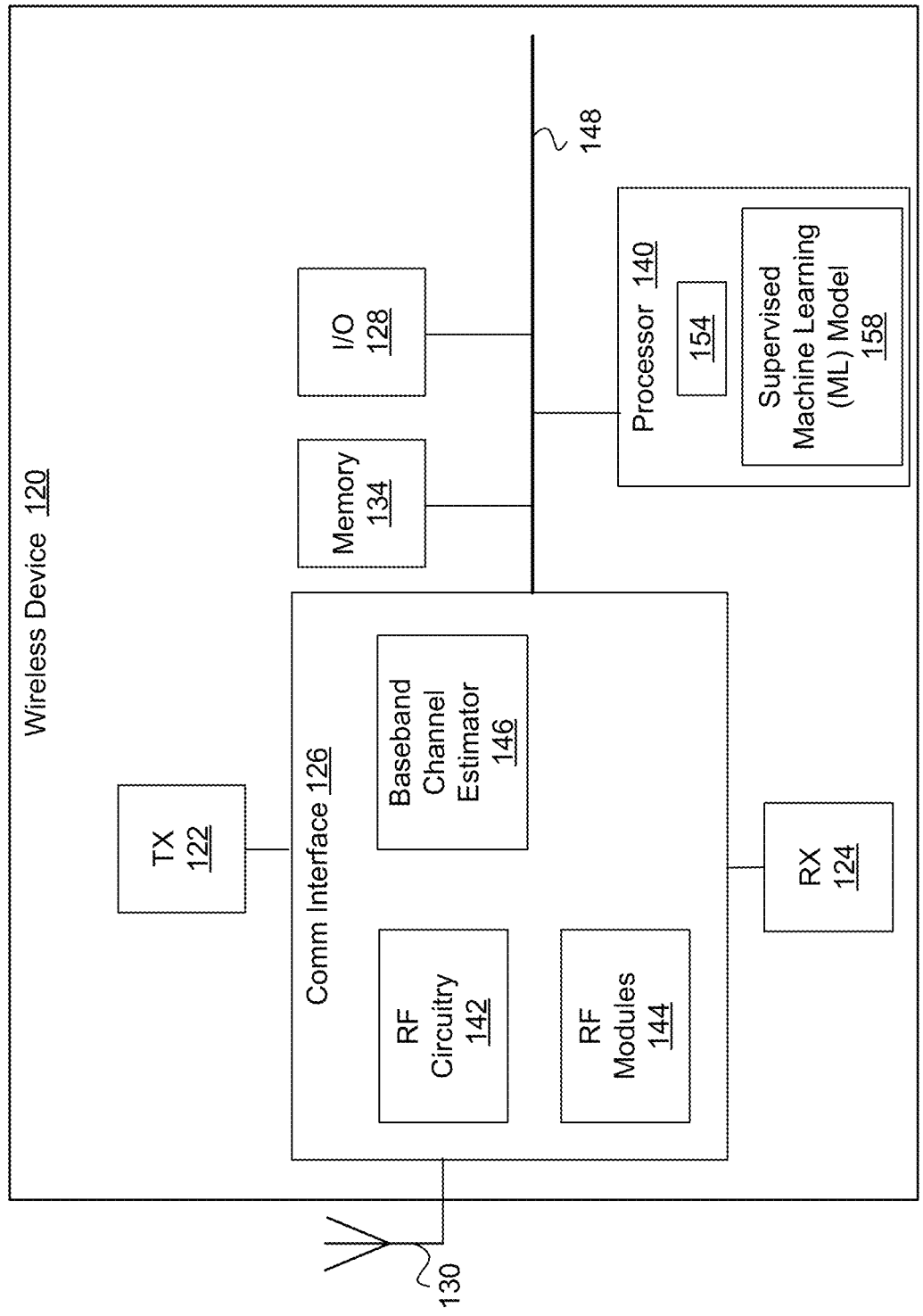
FIG. 1C illustrates a wireless device adapted to detect and transmit channel state information (CSI) or received signal strength indicator (RSSI) data useable by the 2.4 GHz CSI sensing engine and a supervised machine learning model to perform presence detection, according to at least one embodiment.

FIG. 1C illustrates a wireless device 120 adapted to detect and transmit channel state information (CSI) or received signal strength indicator (RSSI) data useable by the 2.4 GHz CSI sensing engine 154 and a supervised machine learning model 158 to perform presence detection, according to at least one embodiment. Accordingly, the wireless device may represent the wireless detector 104 or the access point device 110 in different embodiments. The wireless device 120 may include, but not be limited to, a transmitter (TX) 122 (e.g., a WLAN transmitter), a receiver (RX) 124 (e.g., a WLAN receiver), a communications interface 126, one or more antenna 130, a memory device 134, one or more input/output (I/O) devices 128, and a processor 140. These components may all be coupled to a communications bus 148. The memory device 134 may include storage in which to store the supervised ML model 158, e.g., an SVM or a NN model, or other software components (e.g., mobile companion application) that can perform some of the operations described herein.

In one embodiment, the receiver 124 receives first data indicative of channel properties of a first communication link between the wireless device 120 and a wireless transmitter 122 in the access point device, both of which are located in a geographical region (e.g. home, office building, or the like). In one embodiment, the processor 140 may be configured to direct the TX 122 to transmit the first data, which includes the channel properties, to a remote computing device (e.g., the computing device 150) over the network 115 for supervised ML processing. The processor 140 may further be configured to perform pre-processing of the first data and to classify the pre-processed first data as detecting either a stationary object (e.g., which may be known already to be stationary) or detecting a moving object such as a human, as described herein. In various embodiments, the I/O devices 218 may include an input device, such as a microphone, and an output device such as a speaker.

The antennas (such as the antenna 130) described herein within various devices may be used for Long Term Evolution (LTE) frequency bands, third-generation (3G) frequency bands, Wi-Fi®, and Bluetooth® frequency bands or other WLAN frequency bands, including Zigbee®, Z-wave™ or the like, wide area network (WAN) frequency bands, global navigation satellite system (GNSS) frequency bands such as global positioning system (GPS) frequency bands, or the like.

As illustrated in FIG. 1C, the communications interface 126 may further include RF circuitry 142, a set of RF modules 144, and a baseband channel estimator 146. In one embodiment, one of the RF modules 144 may include a WiFi® PHY at which the RF energy of received RF signals may be measured for purposes of RSSI. The baseband channel estimator 146, by virtue of being incorporated within the communications interface 126, may be coupled to the antenna 130, the TX 122, and to the RX 124, and be adapted to estimate the CSI (or the RSSI) for each channel. As discussed, the CSI includes a detailed channel impulse response (e.g., containing channel properties) with both amplitude and phase information across all the OFDM subcarriers and is updated (at the maximum rate) every OFDM symbol. This provides more information about the environment under surveillance, and thus provides excellent detection capability when applying a supervised ML model to CSI data.

The wireless device 120 may, in various embodiments, continuously upload RSSI or CSI data to the computing device 150 (FIG. 1) for use in supervised ML model processing, or may buffer the RSSI or CSI data in the memory device 134 (or other computer storage) and then periodically upload the RSSI or CSI data at a predetermined time interval. This data may allow the computing device 150 to perform updates to the training of the supervised ML model 158. In one embodiment, the wireless device 120 (or a co-located computing system) is adapted to include sufficient memory, storage, and processor power to be able to directly perform pre-processing and classification with the supervised ML model 158 discussed herein. In this embodiment, the 2.4 GHz CSI sensing engine 154 can perform various operations to collect CSI data, process the CSI data, and use the supervised ML model 158 to detect motion and no-motion conditions, as described below with respect to FIG. 2.

In some embodiments, the wireless device 120 (or co-located computing system) may contain sufficient processing power to perform updates to the training of the supervised ML model 158, and thus may work independently of access to cloud-based resources. These updates may be made using newly received data containing channel properties that confirm or fail to confirm the accuracy of the pre-trained classifiers 162, which are trained as a part of the supervised ML model 158.

The 2.4 GHz CSI sensing engine 154 can perform various operations to collect CSI data and process the CSI data to be used for motion detection, as described below with respect to FIG. 2.

Figure 2:
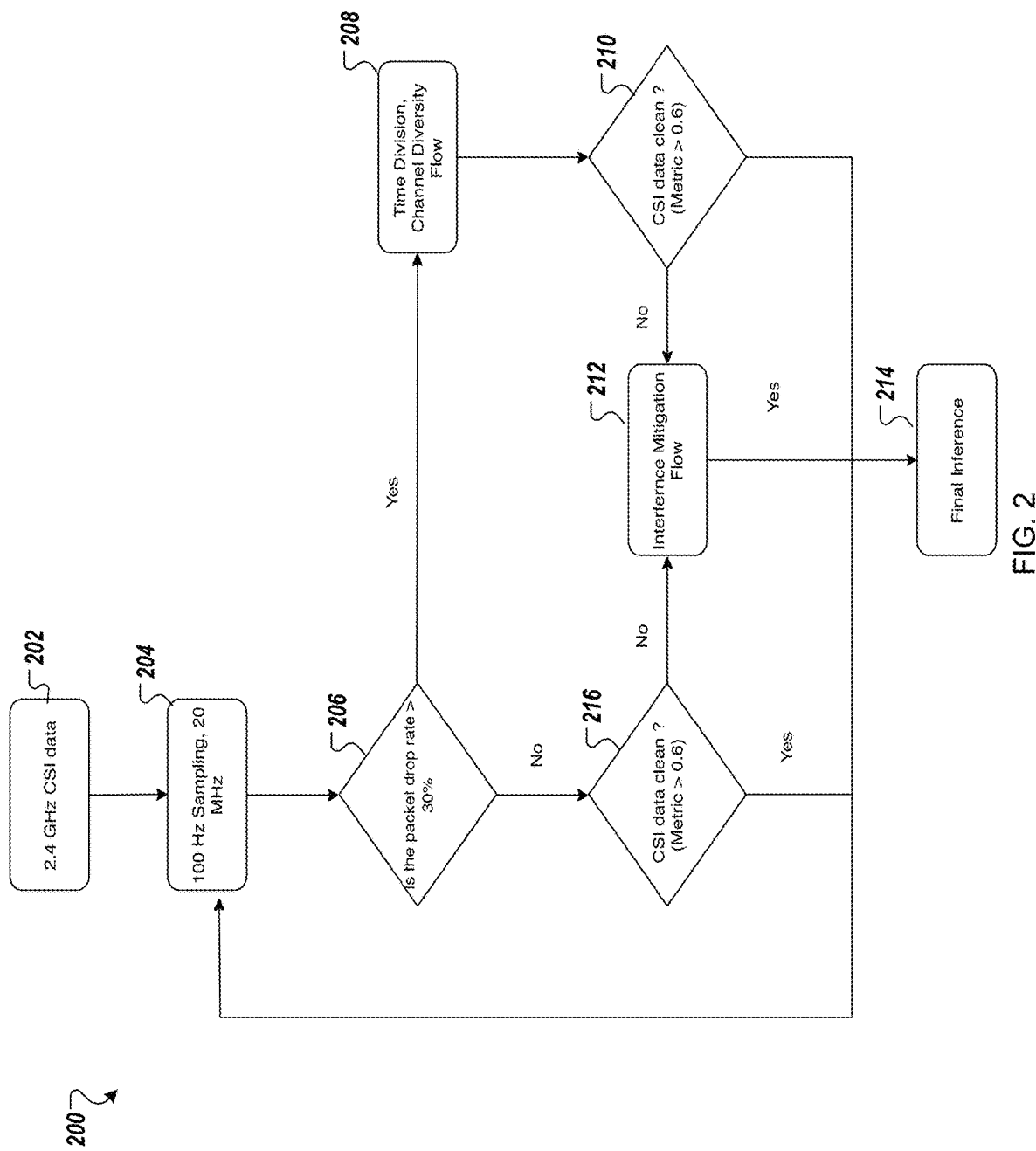
FIG. 2 is a flow diagram of a method of motion detection in the 2.4 GHz band, according to at least one embodiment.

FIG. 2 is a flow diagram of a method 200 of motion detection in the 2.4 GHz band, according to at least one embodiment. The method 200 may be performed by processing logic that may comprise hardware (e.g., circuitry, dedicated logic, programmable logic, microcode, etc.), software (such as instructions running on the processor), firmware, or a combination thereof. In one embodiment, a processor of the wireless detector 104 of the computing device 150, or the wireless device 120 performs the method 200. Alternatively, other components of a disclosed device may perform some or all of the operations of the method 200.

With further reference to FIG. 2, the method 200 may begin with the processing logic receiving first CSI data representing channel properties of a first wireless channel between a pair of wireless devices operating in the 2.4 GHz band (block 202). The processing logic can start to receive the first CSI data in response to received, from a user device, a request to detect a motion condition or a no-motion condition within a home using at least the pair of wireless devices operating in the 2.4 GHz band. The processing logic generates a first set of CSI samples by sampling the first CSI data at a first sampling rate corresponding to a specified amount of time (block 204). Increasing bandwidth and sampling rate will increase the CSI performance. In 2.4 GHz, since bandwidth is limited to 20 MHz, the sampling rate is a programmable parameter that can be adjusted to meet the key performance indicators (KPIs) for a given application. A sampling rate that results in 30 milliseconds (ms) sampling for presence detection can achieve the required KPIs. Some chipsets can support sampling to 10 ms. The higher sampling rate can mitigate the impact caused by interference and congestion in the 2.4 GHz band. In addition, as described in more detail below, a process can be used for interference mitigation in the 2.4 GHz band. In at least one embodiment, the first sampling rate is 100 Hz for the 20 MHz bandwidth of the wireless channel in the 2.4 GHz band.

The processing logic can determine that a first value, representing a packet drop rate between the pair of wireless devices, is greater than a first threshold value (block 206). For example, the first threshold value can be 30%, and if the packet drop rate is greater than 30%, the processing logic can perform operations associated with a time-division, channel diversity process (block 208). Additional details of the time-division, channel diversity process are described below with respect to FIGS. 4A-4D. In at least one embodiment, the processing logic in the time-division, channel diversity process, the processing logic receives second CSI data representing the channel properties of multiple wireless channels between the pair of wireless devices and generates a second set of CSI samples by sampling the second CSI data at a second sampling rate higher than the first sampling rate (e.g., 10 ms samples) while alternating between each of the multiple wireless channels in a specified amount of time (e.g., 30 ms), such as illustrated in FIG. 4B. In at least one embodiment, the processing logic can process the second set of CSI samples to replace outlier samples with a median absolute deviation of a moving window-based filter. In other embodiments, the processing logic can remove the effect of outliers using other methods. Regardless of the method used, the processing logic can determine a variance between collected samples within each subcarrier across a time period. The processing logic can process the second set of CSI samples to remove a trend in the second set of CSI samples by offsetting the second set of CSI samples by a mean value. The trend often manifests in low-frequency components in the CSI samples. The processing logic can process the second set of CSI samples to de-noise the second set of CSI samples using a wavelet transform that removes higher-frequency noise components in the second set of CSI samples. In other embodiments, the processing logic can process the second set of CSI samples to remove low-frequency and high-frequency noise components or at least remove the effects of the low-frequency and high-frequency noise components by adjusting amplitude values in the CSI samples. In short, the processing logic can process the second set of CSI samples to be within a band of interest in which motion and no-motion conditions can be detected. The processing logic can rank a set of channel subcarrier indexes based on a second value representing an average fading power for the respective subcarrier index and a third value representing a variance of the respective subcarrier index over time. Alternatively, other parameter values can be used to rank the set of channel subcarrier indexes, such as a mean, a Fast Fourier Transform (FFT) mean, a standard deviation, an FFT standard deviation, or the like. The processing logic can determine a score of the set of channel subcarrier indexes to rank them. The processing logic can determine each channel subcarrier index score based on one or more of these parameters values. The processing logic can identify a subset of a specified number of channel subcarrier indexes with a higher score than corresponding scores of other channel subcarrier indexes in the set. For example, the subset can include top-three or top-five ranked indexes. The processing logic can determine the motion or no-motion condition within the home using the CSI samples corresponding to the subset of the specified number of channel subcarrier indexes. This can be the final interference by an ML model.

Referring back to FIG. 2, after completing the time-division, channel diversity process at block 208, the processing logic can determine a quality metric associated with the collected CSI data and determine whether the quality metric is above a specified threshold (block 210). The quality metric above the specified threshold indicates that the CSI data is adequate for motion detection. Sometimes this is referred to as the CSI data being clean. It is clean because the CSI data is not disrupted by interference and congestion in the wireless channel. The quality metric can be quantified using various parameters, such as the size of the CSI data, that the expected CSI data is received within a specified amount of time, or any combination of parameters. In at least one embodiment for the quality metric, the processing logic can determine if the size of the second set of CSI samples (or collectively the second CSI data) does not exceed a second threshold value. In another embodiment for the quality metric, the processing logic can determine that the second set of CSI samples (or collectively the second CSI data) is not received in a specified time interval.

In response to determining that the quality metric is above the specified threshold at block 210 (e.g., that the size does exceed the second threshold value or the CSI data is received in the specified time interval), the processing logic uses the CSI data for a final inference at block 214. At block 214, the processing logic determines a motion condition or a no-motion condition within the home using the clean CSI samples.

In response to determining that the quality metric is not above the specified threshold at block 210 (e.g., that the size does not exceed the second threshold value or the CSI data is not received in the specified time interval), the processing logic can perform an interference mitigation process (block 212) to identify and extract CSI samples that are useful in determining the motion condition or the no-motion condition, even though some CSI samples are affected by congestion and interference in the 2.4 GHz frequency band. In at least one embodiment, the interference mitigation process at block 212 includes obtaining a third set of CSI samples based on a first indication of activation of an ACI filter and obtaining a fourth set of CSI samples based on a second indication of deactivation of the ACI filter. The processing logic can process the third and fourth sets of CSI samples to replace outlier samples, remove a trend, and remove higher-frequency noise components from the third set of CSI samples as described herein. The processing logic can statistically rank a set of channel subcarrier indexes using a Cramer-von Mises criterion between the third and fourth sets of CSI samples. The processing logic can use the statistical ranking to identify a subset of a specified number of channel subcarrier indexes in the set of channel subcarrier indexes having a lower ranking (e.g., lower score) than corresponding rankings of other channel subcarrier indexes in the set.

In response to determining that the quality metric is not above the specified threshold at block 210 (e.g., that the size does not exceed the second threshold value or the CSI data is not received in the specified time interval), the processing logic uses only the CSI data from a subset of a specified number of channel subcarriers for a final inference at block 214. At block 214, the processing logic determines a motion condition or a no-motion condition within the home using the select subset of CSI samples determined in the interference mitigation process at block 212.

Referring back to block 206, the processing logic can determine that the first value, representing a packet drop rate between the pair of wireless devices, is equal to or less than the first threshold value. In this case, the processing logic can determine whether a quality metric associated with the collected first CSI data is above the specified threshold (block 216). Unlike at block 210 that uses the second CSI data from the multiple wireless channels, the processing logic uses the collected first CSI data from the wireless channel without performing the time-division, channel diversity process at block 208 because the first value is equal to or less than the first threshold value. In this case, the quality metric being above the specified threshold indicates that the CSI data is adequate (e.g., clean) for motion detection purposes.

In response to determining that the quality metric is above the specified threshold at block 210 (e.g., that the size does exceed the second threshold value or the CSI data is received in the specified time interval), the processing logic uses the CSI data for a final inference at block 214. At block 214, the processing logic determines a motion condition or a no-motion condition within the home using the clean CSI samples.

In response to determining that the quality metric is equal to or less than the specified threshold at block 216 (e.g., that the size does not exceed the second threshold value or the CSI data is not received in the specified time interval), the processing logic can perform operations associated with the interference mitigation process at block 212. In this case, the processing logic uses only the select subset of CSI samples determined in the interference mitigation process at block 212 for a final inference at block 214 to determine a motion condition or a no-motion condition within the home. Additional details of the time-division, channel diversity process are described below with respect to FIGS. 4A-4D.

In at least one embodiment, the processing logic uses the device CSI collector 172 at block 802 or at blocks 802 and 804. The device CSI collector 172 can also determine whether the first value exceeds a threshold value or satisfies a threshold condition at block 206. The processing logic can also use the device CSI collector 172 to perform operations in connection with the time-division, channel diversity process at block 208. The processing logic can use the CSI data processing 174 for some or all of the operations of the time-division, channel diversity process at block 208. The processing logic can use the CSI data processing 174 for some or all operations of the interference mitigation process at block 212. In another embodiment, the processing logic can use the CSI data processing 174 for the operations at blocks 216 and 210. Depending on the number of devices and deployment, part of the CSI processing and analysis can be done on the wireless device, and data can be uploaded to the computing device 150 for more involved tasks.

In at least one embodiment, the processing logic performs a first-level analysis to asses a link quality and eliminate network-level issues. Once the devices are placed at desired positions, an initial check on the basic functionality of exchanging the CSI packets is done in a first stage. Checking if the CSI packets are being exchanged at expected timeslots; received signal strength, congestion metrics, co-existence mode, and other network parameters are analyzed to assess the quality of the link. If there is a fundamental network issue, the user is guided to change the placement of the device; otherwise, if there are no network issues, the CSI values can be processed in a second-level analysis. The processing logic can perform numerical analysis on the CSI data to understand mean, variance across time and subcarriers, a trend of the FFT output values. These values can be compared against the minimum and maximum thresholds defined for motion and no-motion. If the values fall under the previously defined limits, the device can be validated for no-motion and motion. In case of insufficient confidence, the CSI values can be processed by a third-level analysis to analyze and correlate patterns in the CSI data, such as using ML models. In the third-level analysis, dimensionality reduction and clustering techniques, like UMAP and TSNE, analyze and correlate the CSI FFT output patterns. The motion or no-motion conditions can be determined if the patterns match previous data more confidently than a threshold. If there is no proper match with the larger pool of CSI dataset already available, there can be a request for local training to improve prediction accuracy. The CSI values can be added to the existing dataset in both cases.

Figure 3A:
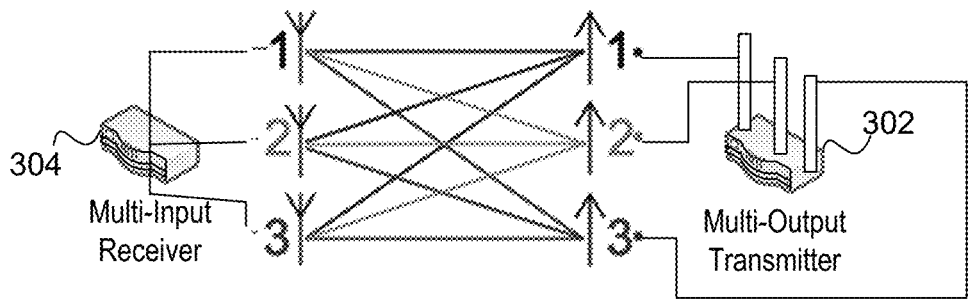
FIG. 3A is a block diagram of a multi-input receiver and a multi-output transmitter in communication, according to one embodiment.

FIG. 3A is a block diagram of a multi-input receiver 304 and a multi-output transmitter 302 in communication, according to one embodiment, to represent how CSI operates. The standard Institute for Electrical and Electronics Engineers (IEEE) 802.11n was established in 2007 to boost the range and throughput of WiFi® service. In IEEE 802.11n, multiple-in, multiple-out (MIMO) OFDM is used, and the physical layer presents a value to estimate the channel status in each subcarrier, e.g., the CSI for each subcarrier. The CSI may therefore be expressed as:

$$H = \begin{bmatrix} h_{11} & h_{12} & \ldots & h_{1N_r} \\ h_{21} & h_{22} & \vdots & h_{2N_r} \\ \vdots & \vdots & \vdots & \vdots \\ h_{N_i1} & h_{N_i2} & \vdots & h_{N_iN_r} \end{bmatrix} \quad (1)$$

where $$H(f_k) = |H(f_k)|e^{j\angle H(f_k)} \quad (2)$$

The term $H(f_k)$ represents the CSI value at the subcarrier level with frequency $f_k$. $|H(f_k)|$ denotes the amplitude and $\angle H(f_k)$ the phase in the subcarrier. The CSI describes how a signal propagates between the transmitter and the receiver device in amplitude and phase. The CSI also reveals the combined effect of scattering, fading, and power decay with respect to the distance of the received signals.

Figure 3B:
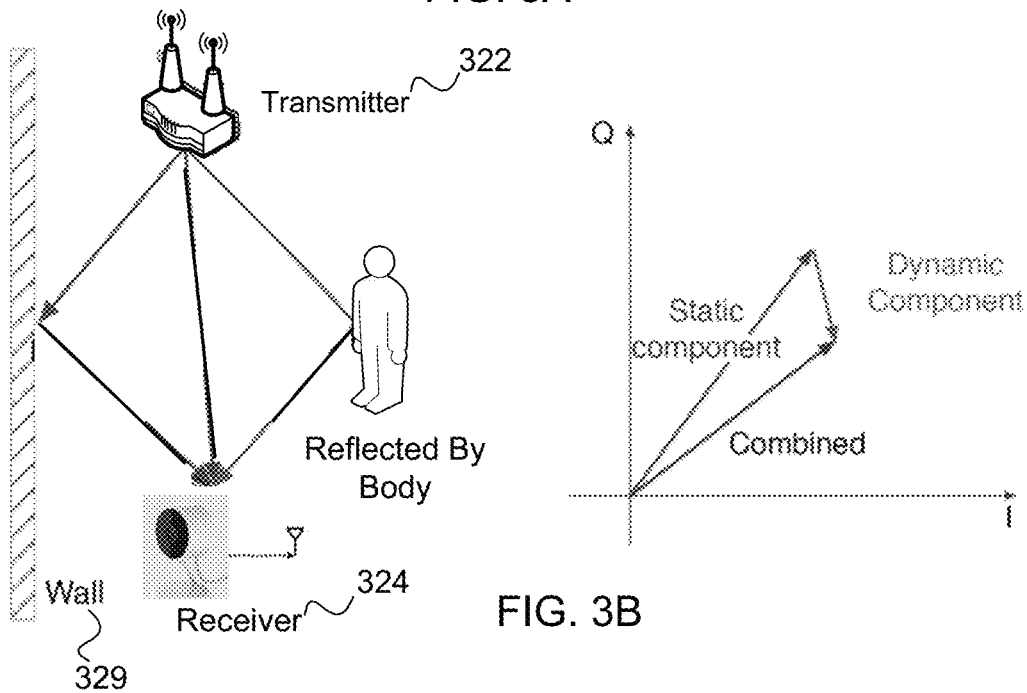
FIG. 3B is a reflection diagram of wireless signals between a transmitter and a receiver with a stationary human in a room, according to one embodiment.
Figure 3C:
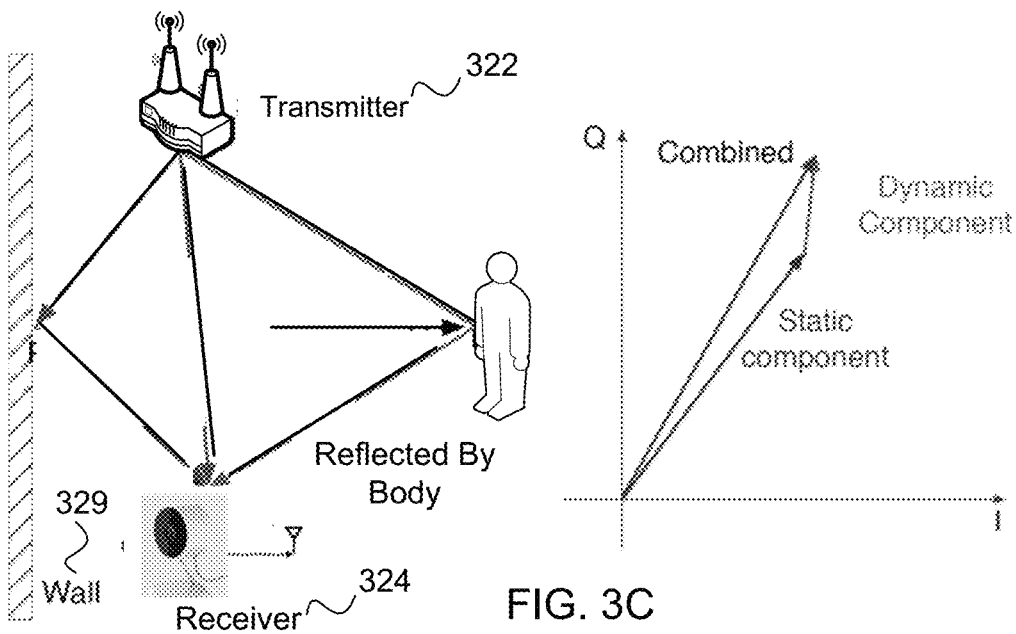
FIG. 3C is a reflection diagram of wireless signals between transmitter and receiver with a moving human in the room, according to one embodiment.

FIG. 3B is a reflection diagram of wireless signals between a transmitter 352 and a receiver 304 with a stationary human, according to one embodiment. FIG. 3C is a reflection diagram of wireless signals between the transmitter 322 and the receiver 324 with a moving human (e.g., $d_k(t)$), according to one embodiment. In one example, the transmitter 322 may be the multi-output transmitter 302 (e.g., a second wireless device), and the receiver 342 may be the multi-input receiver 304 (e.g., a first wireless device).

The transmitter 322 may transmit in many directions, including a line of sight (LoS) path as well as paths that reflect off of objections, such as a wall 329. Signal propagation may also be disturbed by human motion, and different motion activities may return different characteristics in the CSI data. In this way, machine learning may be used to classify the presence of the human. Equation (1) may depict the CSI data within a static channel, e.g., within a communication link that includes no human movement. Equation (2) may detect the CSI data within a combination of a static channel and dynamic channel, where a portion of the CSI data indicates human movement.

$$H(f, t) = e^{-j2\pi\Delta ft} \sum_{k=1}^{N} a_k(f, t) e^{-j2\pi f \tau_k(t)} \quad (1)$$

$$H(f, t) = e^{-j2\pi\Delta ft} \left( H_s(f) + \sum_{k \in P_d} a_k(f, t) e^{-j\frac{2\pi d_k(t)}{\lambda}} \right) \quad (2)$$

where $H_s(f)$ in Equation (2) is the static channel component.

Figure 4A:
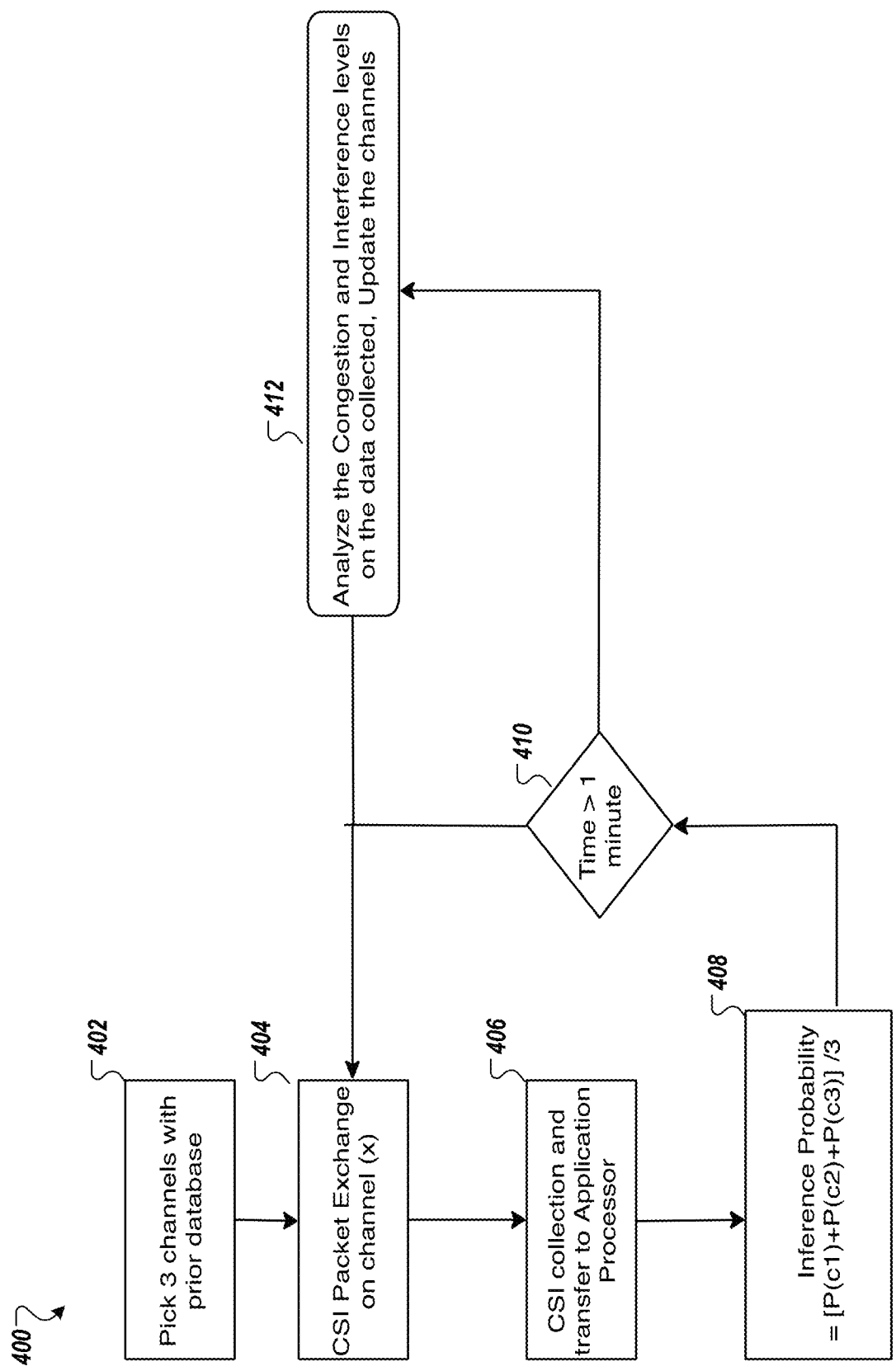
FIG. 4A is a flow diagram of a method of time-division, channel diversity process used for CSI data processing, according to at least one embodiment.
Figure 4B:
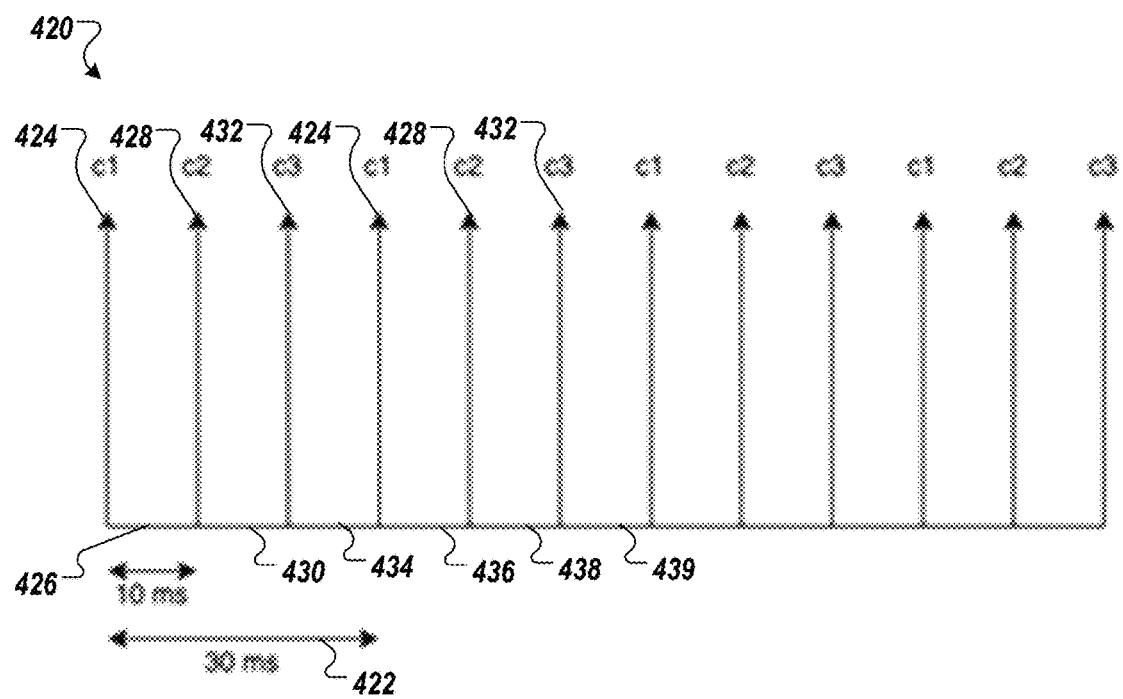
FIG. 4B is a timing diagram showing channel switching and time division between three channels in a specified amount of time, according to at least one embodiment.

FIG. 4A is a flow diagram of a method 400 of time-division, channel diversity process used for CSI data processing, according to at least one embodiment. The method 400 may be performed by processing logic that may comprise hardware (e.g., circuitry, dedicated logic, programmable logic, microcode, etc.), software (such as instructions running on the processor), firmware, or a combination thereof. In one embodiment, a processor of the wireless detector 104, the computing device 150, or the wireless device 120 performs the method 400. Alternatively, other components of a disclosed device may perform some or all of the operations of the method 400.

Figure 4C:
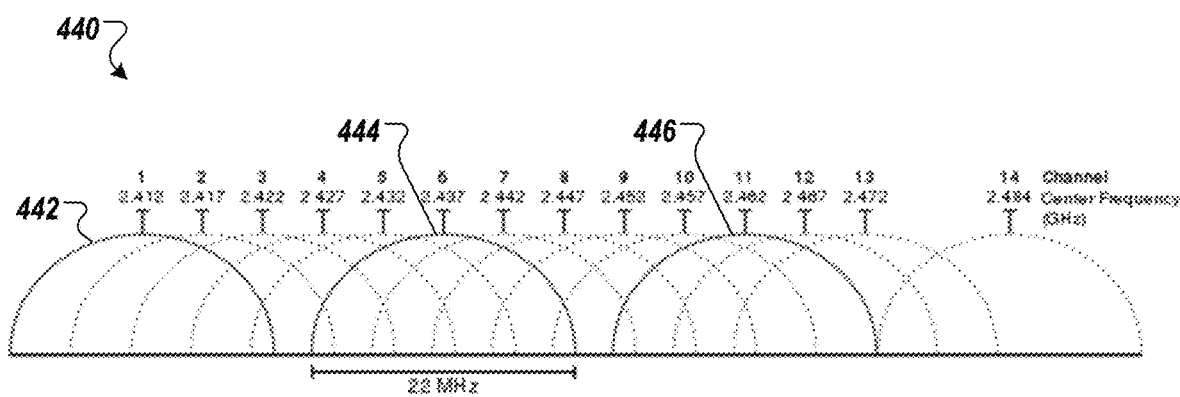
FIG. 4C is a graph showing the 14 wireless channels in the 2.4 GHz frequency band.

With further reference to FIG. 4A, the method 400 may begin with the processing logic selecting a set of channels (e.g., 3) (block 402). The channels can be default channels, such as channels 1, 6, and 11. The channels can also be selected from a database of channels. The database can be updated based on analysis of congestion and interference levels on the data collected. Different channels can be selected for the set based on the update to the database. In at least one embodiment, the set of channels includes two or more channels that are non-overlapping. For example, as illustrated in FIG. 4C, channels 1, 6, and 11 are non-overlapping in frequency. The selection of these three channels provides wide channel diversity across the 2.4 GHz frequency. However, the congestion and interference can cause one of these channels to be less desirable for collecting CSI data. The database can be used to help two or more channels for the set of channels selected at block 402.

After the channels are selected at block 402, the processing logic performs CSI packet exchange on each of the three channels alternatingly (block 402), such as illustrated with three channels in FIG. 4B. The processing logic can perform CSI collection and transfer the CSI data from the selected channels to an application processor for CSI data processing (block 406). The processing logic uses the collected CSI data from the selected channels to determine an inference of a motion or a non-motion condition (block 408). In at least one embodiment, a final inference probability is based on an average probability of CSI samples from the selected channels (e.g., inference probability=[P(c1)+P(c2)+P(c3)]/3). In another embodiment, the inference probability at block 408 is not a final inference and can be used as an intermediate inference that is used as an input to a second ML model or an input to additional inference processing. In at least one embodiment, the processing logic can aggregate the CSI data from each of the selected channels. In another embodiment, the processing logic can process the CSI data from each of selected channels separately and perform additional processing using the separate inferences. In another embodiment, portions from each CSI data sets corresponding to each of the wireless channels can be processed collectively or separately in other manners. The processing logic determines if a specified amount of time has passed at block (410), and returns to block 404 to perform additional CSI packet exchanges. The processing logic optionally can analyze the congestion and interference levels on the data collected and update the channels to be selected from the database (block 412). The CSI data is considered "switched and stitched" to provide channel diversity and an increased sampling rate.

FIG. 4B is a timing diagram 420 showing channel switching and time division between three channels in a specified amount of time 422, according to at least one embodiment. In the specified amount of time 422 (e.g., 30 ms), a first channel 424 is sampled for a first period 426 (e.g., 10 ms), a second channel 428 is sampled for a second period 430 (e.g., 10 ms), and a third channel 432 is sampled for a third period 434 (e.g., 10 ms). At the end of the specified amount of time 422, the first channel 424 is sampled again for a fourth period 436, then the second channel 428 is sampled for a fifth period 438, and then the third channel 432 is sampled for a sixth period 439, and so on. The 2.4 GHz channels are interference prone and experience high amounts of congestion. Having channel diversity helps overcome interference impact and helps with congestion. As shown in FIG. 4B, the time-division, channel diversity process (e.g., 400) switches between three channels each time, with a gap of 10 ms in a 30 ms time window. As described herein, the set of channels selected can be three non-overlapping channels, such as channels 1, 6, and 11, as illustrated in FIG. 4C. Alternatively, other combinations of two or more channels can be selected for the time-division, channel diversity process of method 400.

FIG. 4C is a graph 440 showing the 14 wireless channels in the 2.4 GHz frequency band. As described above, two or more of the 14 wireless channels can be selected for the time-division, channel diversity process of method 400. In at least one embodiment, a first channel 442, a second channel 444, and a third channel 446 are selected for the time-division, channel diversity process of method 400. In at least one embodiment, the first channel 442 is channel 1, second channel 442 is channel 6, and third channel 444 is channel 11. These three channels can be a default set since the three wireless channels are non-overlapping channels and provide the widest diversity in the 2.4 GHz. Any combination of two or more wireless channels can be selected from a database for the set in at least one embodiment. The database can include congestion and interference levels associated with the collected data. As reflected in the database, one channel can be selected with lower congestion and interference levels.

With further reference to FIG. 4A, the method 400 may begin with the processing logic determining that the device CSI collector 172 cannot capture CSI packets as expected, such as illustrated and described above with respect to block 206 of FIG. 2. In at least one embodiment, the processing logic can determine whether the CSI packets are being received at regular time intervals or the CSI packets have a size greater than a specified threshold. For example, a threshold can represent the predetermined time interval, and the processing logic can determine if the CSI packets are received in time intervals that are less than the threshold. The processing logic can determine if it receives enough CSI packets to ensure good link quality for analyzing CSI data. In another embodiment, the processing logic can determine the size of the CSI packet. If the size is above a threshold size, the processing logic can determine that the CSI packet has useful information and there is not a network issue. If the CSI packets are not captured at the desired time intervals, the processing logic analyzes RSSI data, airtime utilization data, congestion statistic data, coexistence mode data, and/or other network parameters, such as transmission metrics (e.g., airtime utilization data, congestion statistic data, or the like) to assess whether the link has network issues that will prevent further processing of the CSI data. In at least one embodiment, the processing logic identifies a network issue with the wireless channel using at least one of second CSI data, RSSI data, airtime utilization data, or congestion statistic data. If there are network issues, the CSI data cannot be used to validate the placements of devices or motion detection. The network issues may be indicative of poor device placement. In some cases, the network issues may alert the user to other unrelated issues to device placement. The processing logic can assess traffic patterns, how many devices are connected in a network, whether there is packet loss caused by coexistence issues (e.g., devices in a personal area network (PAN) are operating in proximity to the devices in the WLAN), or the like. The processing logic can use these transmission metrics to determine whether a fundamental network issue affects the receipt of CSI data. In particular, the processing logic determines whether there is a fundamental network issue based on the transmission metrics analyzed. If there is a fundamental network issue, the processing logic determines that the CSI data is not adequate for motion and non-motion detection. The processing logic can prompt the user that there is a fundamental network issue detected.

However, if the device CSI collector 172 can capture CSI packets at desired time intervals, the processing logic filters and pre-processes the CSI values in the CSI packets (also referred to as CSI samples). In at least one embodiment, the filter and pre-processing can be done on the device when collected. In another embodiment, the device can send the raw data to the cloud system, and the cloud system can filter and pre-process the raw data. In at least one embodiment, the processing logic can filter the CSI samples so that only some of the CSI samples are sent to the cloud system. In another embodiment, the processing logic can normalize the CSI samples. The processing logic can perform some time-domain filtering to remove noise in the CSI samples in at least one embodiment. The processing logic applies a hamming filter to filter out CSI samples with a high variance in at least one embodiment. In at least one embodiment, some CSI values are missing, and the processing logic can interpolate to obtain the CSI values.

In at least one embodiment, the processing logic computes one or more statistical parameter values over a time period. The statistical parameter values can include a maximum value, a minimum value, a mean value, a variance value, a standard deviation value, an entropy value, a mean cross rate value, a skewness value, a kurtosis value, or the like. In at least one embodiment, the device CSI collector 172 (or the CSI data processing 174) computes three statistical values in evaluating a sequence of CSI samples, including an average (mean) value, a variance value, and a standard deviation (SD) value. The average value represents a constant level of the samples. The average value can specify the average or constant value of a signal. The variance value indicates the magnitude of the fluctuations about the average value. The variance value can represent the magnitude squared, or power, of the fluctuating component of the signal. The SD value is an indication of the magnitude of the fluctuating component of the signal. In at least one embodiment, the device CSI collector 172 (or the CSI data processing 174) computes an FFT of the CSI data over time and across OFDM subcarriers. In another embodiment, the processing logic computes statistics of the FFT outputs as well, such as the FFT mean, variance, SD, or the like. In at least one embodiment, the device CSI collector 172 can compute an image (e.g., two-dimensional matrix of values) representing the channel that can be used to classify as motion or no motion detections. The device CSI collector 172 (or the CSI data processing 174) can compute statistical values of the FFT data, such as the FFT mean values, the FFT variance value, and the FFT standard deviation values.

In general, the CSI data for a channel is not expected to change when there is no motion or presence to disrupt the channel. If a person is present or moves between the transmitter and receiver, the CSI data for the channel is expected to change. The processing logic can compute the FFT of the CSI data to analyze the frequency components. After FFT, the CSI data can show signal patterns for certain subcarrier indexes that represent different feature extractions representing the presence and motion or non-motion of a person in a location with the transmitter and receiver. For example, the feature extractions can represent the presence of a person, whether the person is walking slowly, walking, slowly moving while sitting, and other features. When there is no motion between the transmitter and receiver, there may be a direct current (DC) component in the FFT values and lower values or zero values in the other frequency components. In contrast, when there is motion between the transmitter and receiver, there may be spikes in the frequency components where the motion affects the channel. The FFT values can help classify when there is no motion and motion. The processing logic compares the statistical parameter values with expected values or thresholds for motion and no motion in at least one embodiment. For example, the processing logic can compare the current FFT values against an FFT mean or the current SD against an SD threshold. Similarly, the processing logic can compare the current variance against a threshold variance. In at least one embodiment, if the FFT value is less than the FFT mean (or SD), the processing logic determines whether there is a match with an available ground truth (GT) table. In at least one embodiment, if the FFT value is greater than the FFT mean (or SD), the processing logic determines whether there possible motion with a confidence score greater than a specified threshold (e.g., 70%). If the confidence score exceeds the specified threshold, the processing logic determines whether there is a match with the available GT table. In at least one embodiment, the GT table is a decision-mapping table, such as illustrated in FIG. 4D. In at least one embodiment, the processing logic returns to capture CSI packets when there is a no-motion condition to validate motion detection. In at least one embodiment, the processing logic performs the numerical analysis as a check that uses less computational resources than ML classifications in a machine learning-based analysis.

In at least one embodiment, the processing logic can analyze raw pixels of the CSI image generated in the previous operation and perform dimensionality reduction and clustering techniques, like UMAP and TSNE, to analyze and correlate the CSI FFT output patterns. In at least one embodiment, the clustering can be performed iteratively. The processing logic determines whether the current data matches previous data. If there is a match, the processing logic determines if the match has a greater confidence score than a specified threshold (e.g., 75%). If the confidence score exceeds the specified threshold, the processing logic can determine a motion or a no-motion condition accordingly. In some cases, the processing logic can prompt the user to change the placement of the device and perform additional local training of the ML model for the local conditions.

In at least one embodiment, the processing logic can perform local training by receiving the CSI stream and performing interpolation and infinite impulse response (IIR) filtering on the CSI stream. The processing logic can compute one or more statistical parameter values and the FFT of the CSI values. The processing logic can also compute statistical parameter values on the FFT results. For example, the processing logic can compute the variance, the mean, the cross rate, and entropy of the interpolation and IIR filtering results. The processing logic can also compute the variance, the mean, the cross rate, and entropy of the results of the FFT. The processing logic can label the training data set accordingly. The processing logic can receive user feedback to help with labeling the training data set. The training data set can be used to train the ML model used in the classification stage. The processing logic can perform these operations as additional training to fine-tune an existing ML model.

In the classification stage, the processing logic receives the CSI stream and performs interpolation and IIR filtering on the CSI stream. The processing logic can compute one or more statistical parameter values and the FFT of the CSI values. The processing logic can also compute statistical parameter values on the FFT results. For example, the processing logic can compute the variance, the mean, the cross rate, and entropy of the interpolation and IIR filtering results. The processing logic can also compute the variance, the mean, the cross rate, and entropy of the results of the FFT. The processing logic can generate the testing data set input into the trained ML model to detect presence, motion, no-motion, or the like. The classification in the classification stage can also receive user feedback to improve the performance of the trained ML model.

FIG. 4D is a decision-mapping table 480 to indicate disclosed solutions to the possibility of false-positive or false-negative motion detections, according to various embodiments. Note that the decision-mapping table 480 is set up with decision results along columns and the ground truth in the first column. As expected with detection using wireless signals, motion is detected with high confidence in the true negative (TN) and true positive (TP) scenarios. Note, however, that false positives (FP) and false negatives (FP) are to be reduced to increase detection confidence in these scenarios.

False positive (FP) detection may be reduced via the employment of wireless detection (e.g., with the use of WiFi® technology to capture CSI or CSI-like data) combined. Furthermore, false negatives (FP) may be reduced by analyzing a few samples over a longer time window, instead of relying on a decision for each sample. In other words, when multiple decisions within that time window exceed a determined threshold number of decisions, the disclosed wireless detector or system may trigger an action based on confirmed motion (e.g., trigger a light switch, a thermostat, or signal a security system).

The decision-mapping table 480 can include additional rows for motion, no-motion, or other features in another embodiment.

Figure 5A:
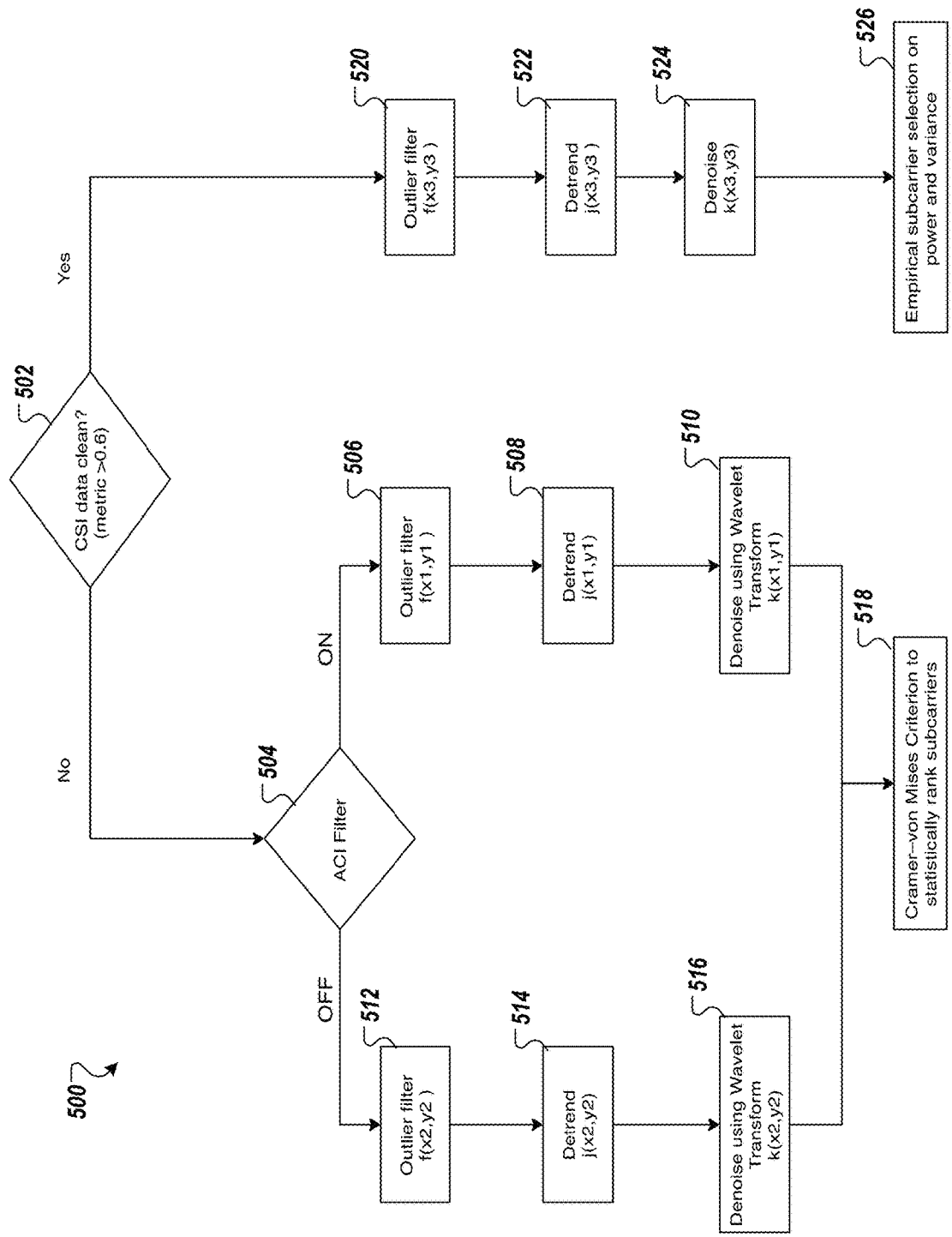
FIG. 5A is a flow diagram of an interference mitigation process method used for CSI data processing, according to at least one embodiment.

FIG. 5A is a flow diagram of a method 500 of an interference mitigation process used for CSI data processing, according to at least one embodiment. The method 500 may be performed by processing logic that may comprise hardware (e.g., circuitry, dedicated logic, programmable logic, microcode, etc.), software (such as instructions running on the processor), firmware, or a combination thereof. In one embodiment, a processor of the wireless detector 104, the computing device 150, or the wireless device 120 performs the method 500. Alternatively, other components of a disclosed device may perform some or all of the operations of the method 500.

With further reference to FIG. 5, the method 500 may begin with the processing logic determining whether collected CSI data is clean (block 502). Block 502 can be similar to blocks 210 or 216 of FIG. 2. As described above, the collected CSI data can be CSI data collected from a set of wireless channels (as a result of the time-division, channel diversity process) or CSI data collected from a wireless channel without the time-division, channel diversity process. It should be noted that for each stream of the CSI data collected on different channels, the following is the processing flow used to mitigate different interference effects in the 2.4 GHz band.

As described above, the processing logic determines that the CSI data is not clean by determining that a size of CSI data does not exceed a second threshold value (e.g., the quality metric is greater than a specified threshold value like 0.6) or the CSI data is not received in a specified time interval.

In response to determining that the size does not exceed the second threshold value or the third CSI data is not received in the specified time interval at block 502, the processing logic determines whether an ACI filter is activated (block 504). ACI is one of the main factors that affect the CSI quality. ACI works by dynamically controlling an automatic gain control (AGC) circuit while sensing the co-channel interference, which changes the received power. This received power change will appear as a random, artificial fading artifact in the CSI data and will eventually result in bad classification for use cases like presence detection with CSI-based sensing. To overcome the effect of ACI on the CSI data, the processing logic can obtain samples when the ACI filter is activated and when the ACI filter is de-activated, pre-process the samples and statistically select subcarrier indexes using the Cramer-von Mises criterion. Alternatively, other fitting techniques can be used.

Referring back to FIG. 5A, the processing logic obtains a first set of CSI samples based on a first indication of activation of an ACI filter at block 504, and the first set of CSI samples are processed to replace outlier samples (block 506), a trend (block 508), and higher-frequency noise components from the first set of CSI samples (block 510). The processing logic also obtains a second set of CSI samples based on a second indication of deactivation of the ACI filter at block 504, and the second set of CSI samples are processed to replace outlier samples (block 512), remove a trend (block 514), and remove higher-frequency noise components from the second set of CSI samples (block 516). Once the two sample sets have been obtained and processed, the processing logic statistically ranks a set of channel subcarrier indexes using a Cramer-von Mises criterion between the two sample sets (block 518). Once ranked, the processing logic can identify a subset of a specified number of channel subcarrier indexes in the set of channel subcarrier indexes having a lower ranking than rankings of other channel subcarrier indexes in the set (not illustrated in FIG. 5A). In this case, the lower rankings values by the Cramer-von Mises criterion represent better fits between the distributions after processing. That is, the lower values of rankings indicate that the CSI samples are not impacted or less impacted by the ACI filter that is used for congestion and interference. The processing logic can use the CSI samples corresponding to the subset of the specified number of channel subcarrier indexes to determine a motion condition or a no-motion condition (not illustrated in FIG. 5A).

Referring back to block 502, if the processing logic determines that the CSI data is clean, the processing logic can process the collected CSI data. The processing logic can process the CSI data to replace outlier samples (block 520), remove a trend (block 522), and remove higher-frequency noise components from the CSI data (block 524). The processing logic can rank a set of channel subcarrier indexes based on a second value representing an average fading power of the respective channel subcarrier index and a third value representing a variance of the respective channel subcarrier index (block 526). The processing logic can identify a subset of a specified number of channel subcarrier indexes in the set of channel subcarrier indexes having a higher ranking than rankings of other channel subcarrier indexes in the set (not illustrated in FIG. 5A). In this case, the higher rankings represent the subcarriers that should be used for motion or no-motion detection. The processing logic determines the motion condition or the no-motion condition within the home using the CSI samples corresponding to the subset of the specified number of channel subcarrier indexes (not illustrated in FIG. 5A).

In case the CSI data is not clean at block 502, the ACI filter can be turned on and turned off via a soft mode at a system level, and the interference mitigation process can be initiated to perform the operations described herein. In a first step, the ACI filter is turned on, which is generally the default setting, and the CSI samples are collected at a specified sampling (e.g., 100 ms). The number of CSI samples collected depends on the use case or application. For example, at the sampling rate of 100 samples/second and an application latency requirement of 2 seconds, 200 CSI samples will be collected. In a next step, the processing logic can process the CSI samples to replace outlier data points with a median absolute deviation of a moving window-based filter (block 506). The processing at block 506 can result in the removal of large changes in the CSI samples caused by changes in power in the received signals. In a next step, the processing logic can de-trend the CSI data (i.e., remove a trend) by offsetting the CSI samples from a mean value (block 508). This can help remove low-frequency distortion in the CSI samples. In a next step, the processing logic can process the data to de-noise the CSI data by using a wavelet transform that removes high-frequency noise components from the de-trended CSI data (block 510).

In order to correct for ACI in the CSI samples being processed, the processing logic obtains CSI data with ACI-off setting and performs similar processing to replace outlier data-points (block 512), de-trend (block 514), and de-noise using wavelet transform (block 516) for comparison. The Cramer-von Mises criterion for goodness of fit test for each subcarrier index can be used (block 518). A lower value test score represents better CSI data as compared to higher-value test scores. Intuitively, this implies that the impact of ACI on that subcarrier is not that significant, and picking those subcarriers will have a high impact on the use-case accuracy. Finally, all the subcarrier indexes can be ranked from lowest to highest test scores in a rank array. The processing logic can select a first N subcarriers from the rank array for the sensing application, where N is a positive integer greater than one. Typically, the first five subcarriers capture most of the changes in the environment, as illustrated in FIGS. 5B and 5D, whereas the last five subcarriers do not capture changes in the environment very well, as illustrated in FIGS. 5C and 5E.

In at least one embodiment, in the case that the CSI data is clean at block 502, the processing logic can use a simplistic approach that does not need to turn the ACI filter on and off as described above. In this approach, the processing logic can still use some outlier filtering (block 520), de-trending (block 522), and de-noise (block 524) processing to remove any outliers, low-frequency distortion, and high-frequency fluctuations in the CSI data. Thereafter, the subcarrier selection can use an average fading power of the respective channel subcarrier index and a variance of the respective channel subcarrier index to rank all the subcarriers empirically (block 526).

Once ranked (at block 518 or 526), the processing logic can choose the top 5 subcarriers for data inference, illustrated in FIGS. 5B-5E.

Figure 5B:
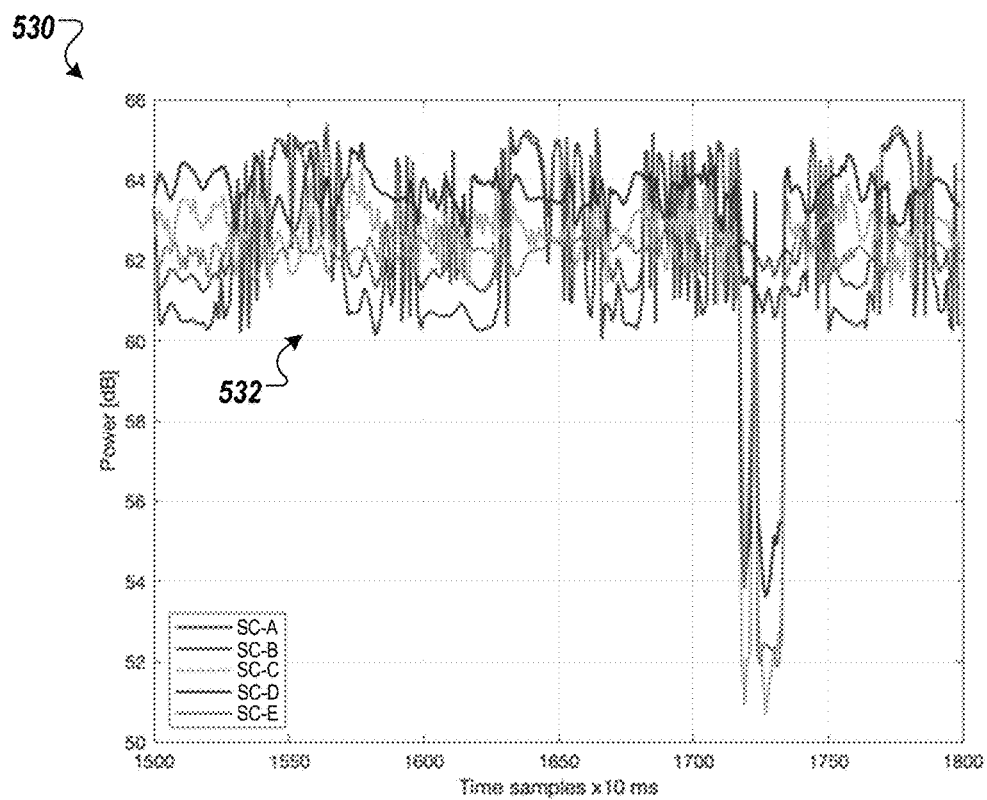
FIG. 5B is a graph showing CSI data for top-five ranked subcarrier indexes for detecting a motion condition, according to at least one embodiment.
Figure 5C:
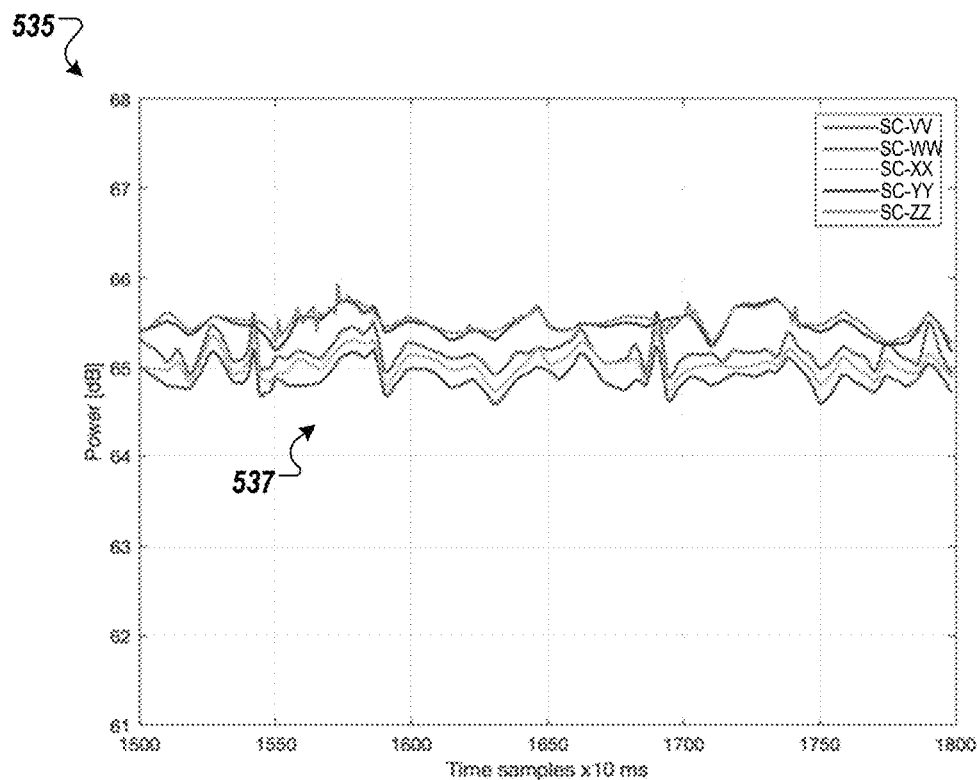
FIG. 5C is a graph showing CSI data for bottom-five ranked subcarrier indexes for detecting a motion condition, according to at least one embodiment.
Figure 5D:
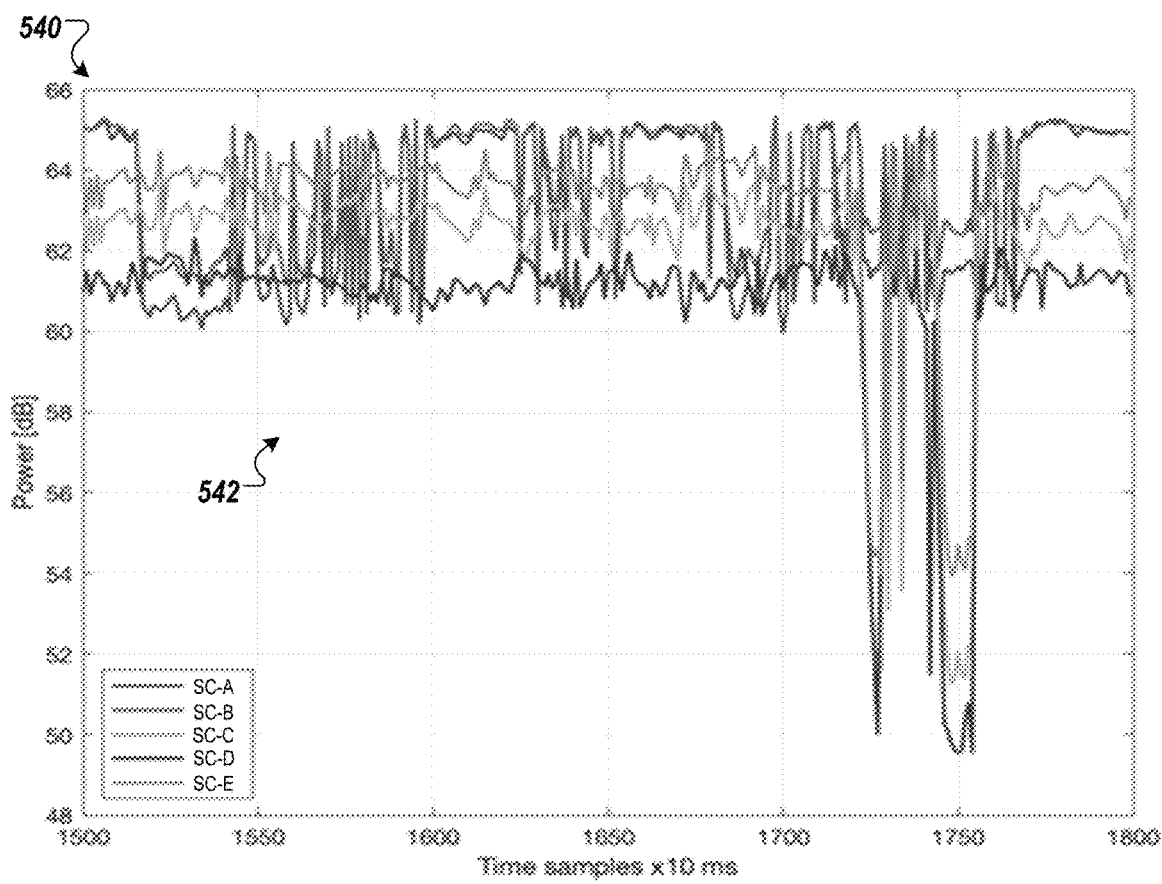
FIG. 5D is a graph showing CSI data for top-five ranked subcarrier indexes for detecting a no-motion condition, according to at least one embodiment.
Figure 5E:
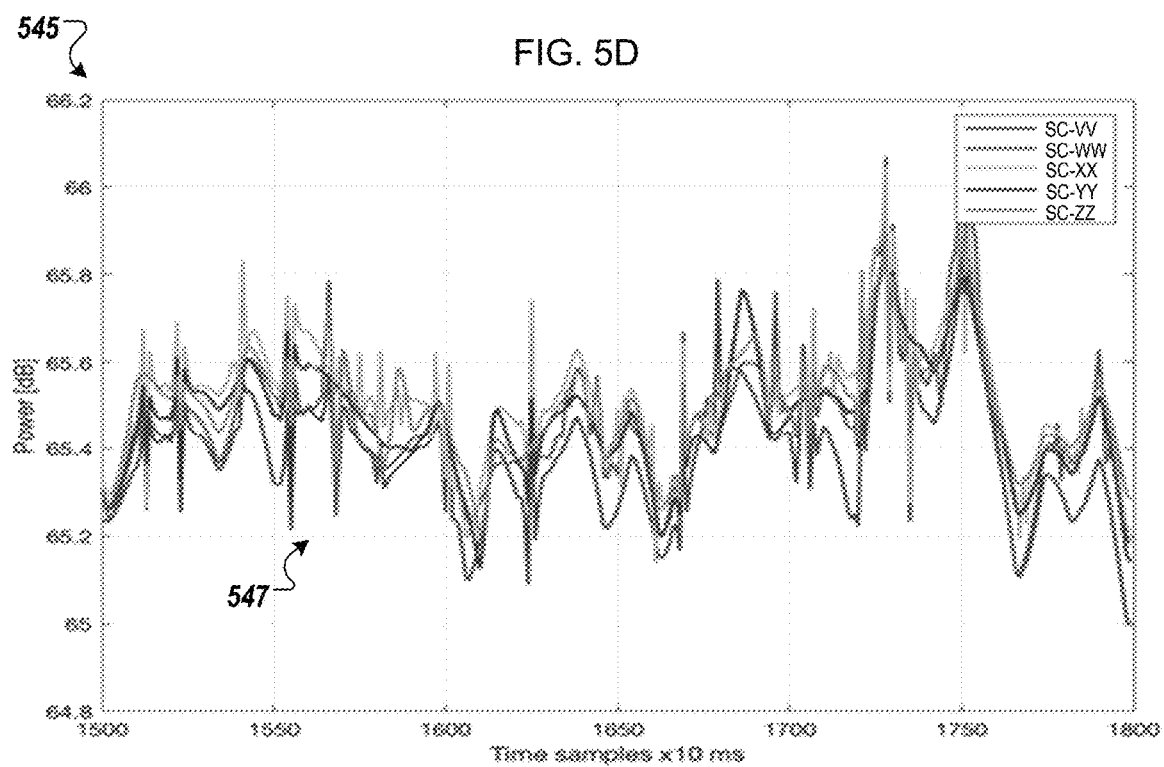
FIG. 5E is a graph showing CSI data for bottom-five ranked subcarrier indexes for detecting a no-motion condition, according to at least one embodiment.

FIG. 5B is a graph 530 showing CSI data for top-five ranked subcarrier indexes 532 for detecting a motion condition, according to at least one embodiment.

FIG. 5C is a graph 535 showing CSI data for bottom-five ranked subcarrier indexes 537 for detecting a motion condition, according to at least one embodiment. The graphs show that one can easily infer the big changes in the amplitude of top-5 subcarriers in this case, while the last 5 subcarriers show very low variations.

FIG. 5D is a graph 540 showing CSI data for top-five ranked subcarrier indexes 542 for detecting a no-motion condition, according to at least one embodiment.

FIG. 5E is a graph 545 showing CSI data for bottom-five ranked subcarrier indexes 547 for detecting a no-motion condition, according to at least one embodiment. Similarly, in the no-motion case, the top-5 subcarriers show little variation, and the bottom-5 subcarriers show more variations.

FIGS. 5G-5K illustrate the results of intermediate steps described above when data is not clean, and the ACI filter is turned on and turned off for interference mitigation.

Figure 5F:
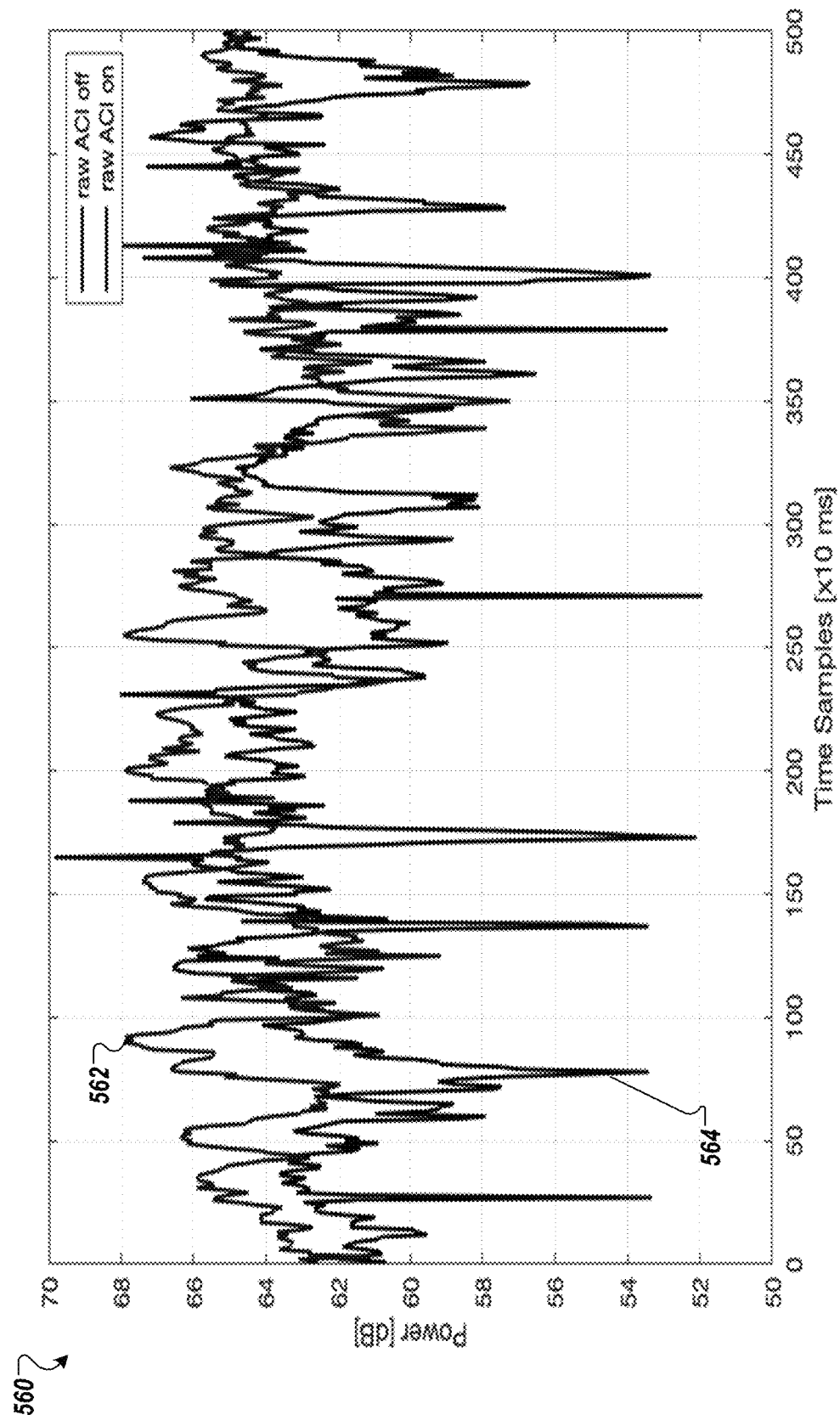
FIG. 5F is a graph showing CSI data with an ACI filter activated and CSI data with the ACI filter de-activated, according to at least one embodiment.

FIG. 5F is a graph 550 showing CSI data with an ACI filter activated 552 and CSI data with the ACI filter de-activated 554, according to at least one embodiment. The CSI data can be the raw CSI data with ACI filter-on and ACI filter-off.

Figure 5G:
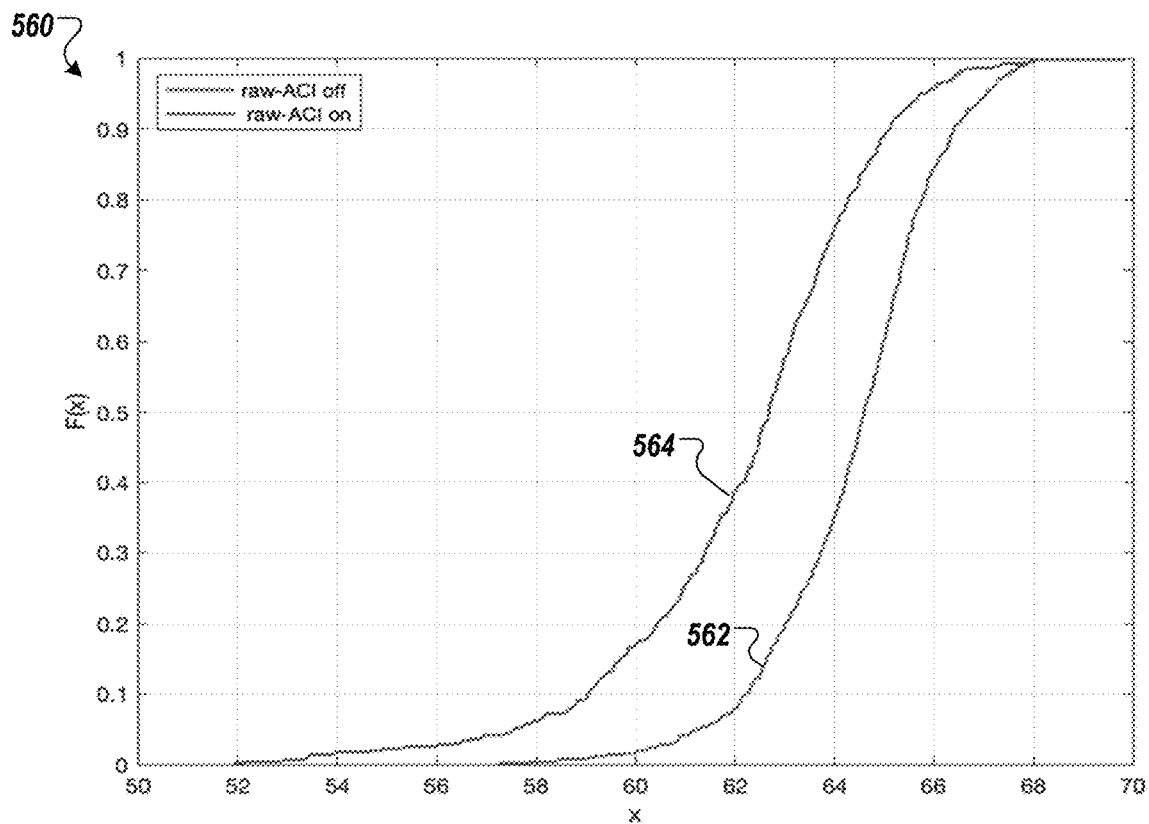
FIG. 5G is a cumulative distribution function (CDF) graph showing CSI data with an ACI filter activated and CSI data with the ACI filter de-activated for a first channel subcarrier, according to at least one embodiment.

FIG. 5G is a cumulative distribution function (CDF) graph 560 showing CSI data with an ACI filter activated 562 and CSI data with the ACI filter de-activated 564 for a first channel subcarrier, according to at least one embodiment. The CDF of the raw CSI data for subcarrier 3 is shown in FIG. 5G.

Figure 5H:
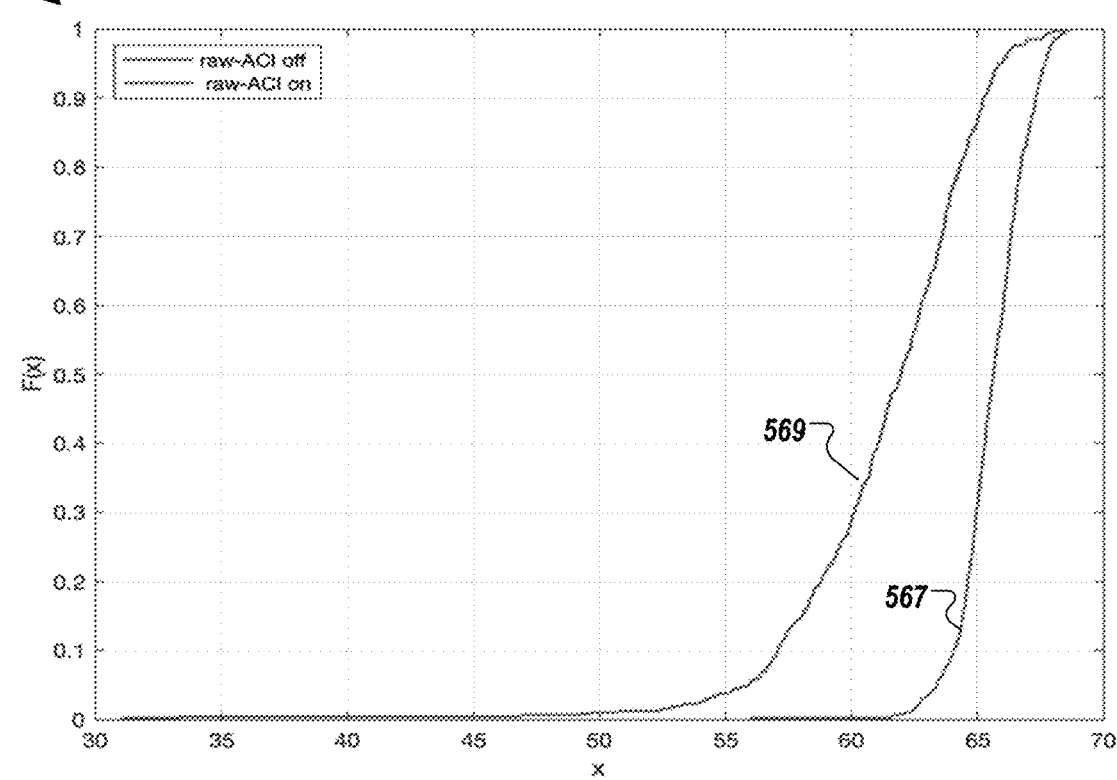
FIG. 5H is a CDF graph showing CSI data with an ACI filter activated and CSI data with the ACI filter de-activated for a second channel subcarrier, according to at least one embodiment.
Figure 5I:
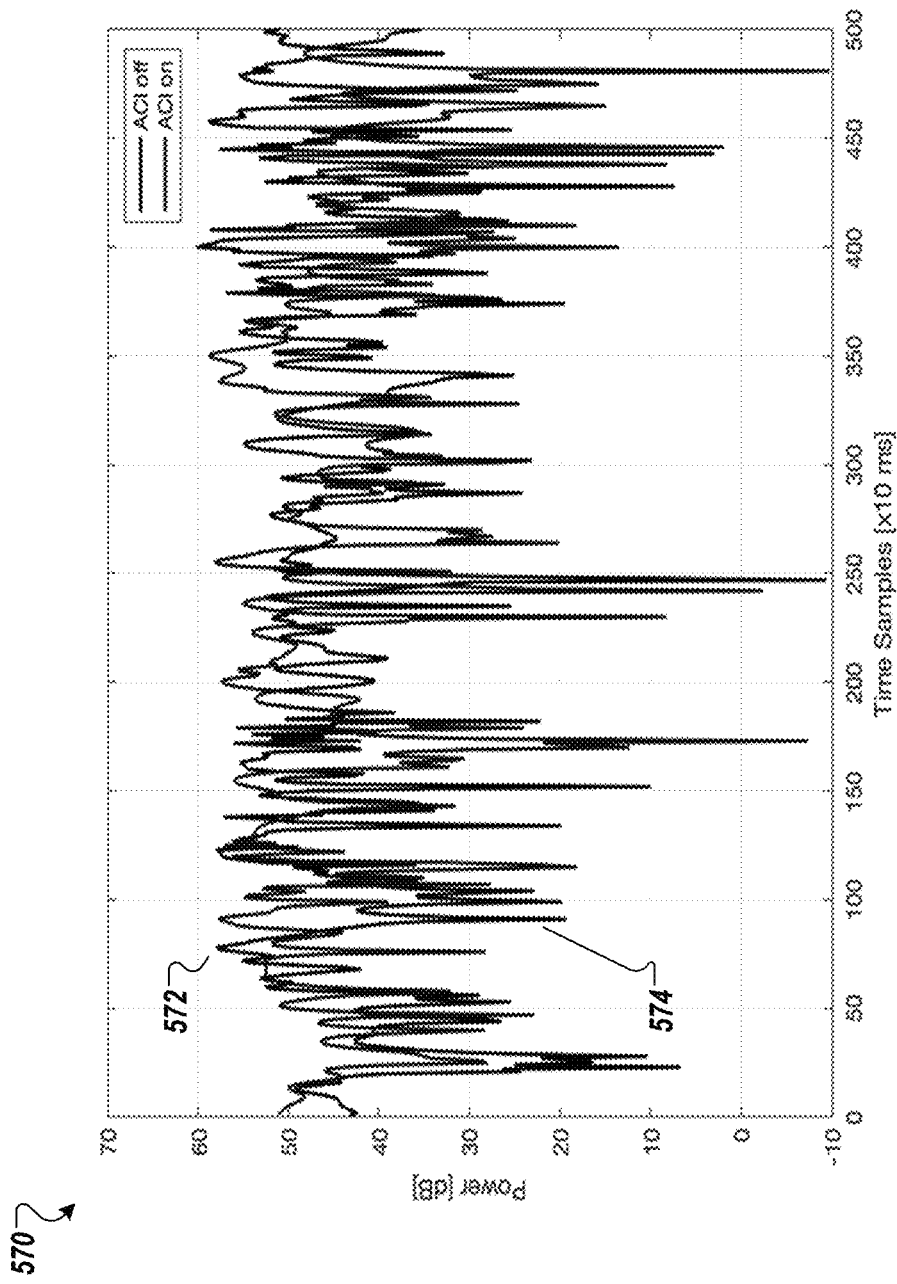
FIG. 5I is a graph showing corrected CSI data after outlier replacement, de-trending, and de-noising the CSI data, according to at least one embodiment.

FIG. 5H is a CDF graph 565 showing CSI data with an ACI filter activated 567 and CSI data with the ACI filter de-activated 569 for a second channel subcarrier, according to at least one embodiment. The CDF of the raw CSI data for subcarrier 15 is shown in FIG. 5H.

FIG. SI is a graph 570 showing corrected CSI data with an ACI filtered activated 572 after outlier removal, de-trending, and de-noising and corrected CSI data with the ACI filtered de-activated 574 after outlier removal, de-trending, and de-noising, according to at least one embodiment. The CDFs after correction of the individual subcarriers are shown in FIGS. 5J-5K.

Figure 5J:
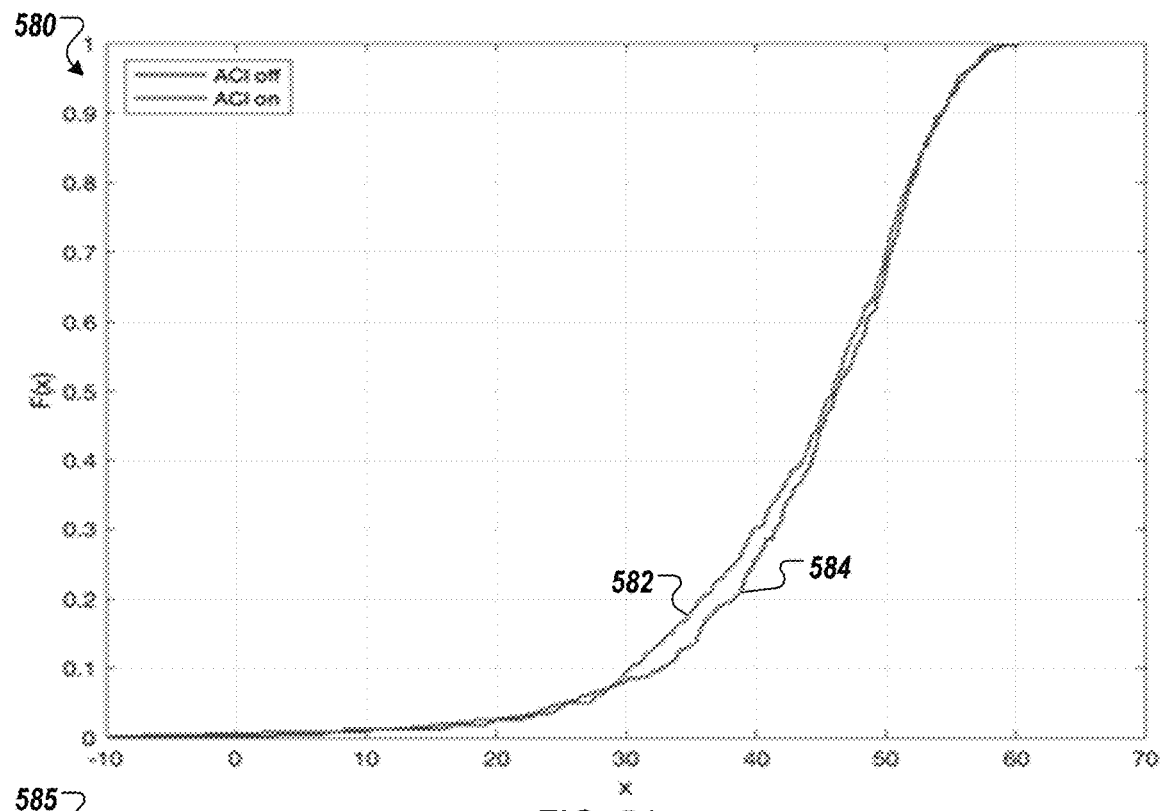
FIG. 5J is a CDF graph showing corrected CSI data with an ACI filter activated and CSI data with the ACI filter de-activated for the first channel subcarrier, according to at least one embodiment.

FIG. 5J is a CDF graph 580 showing corrected CSI data with an ACI filter activated 582 and CSI data with the ACI filter de-activated 584 for the first channel subcarrier, according to at least one embodiment. The CDF of the corrected CSI data for subcarrier 3 is shown in FIG. 5J.

Figure 5K:
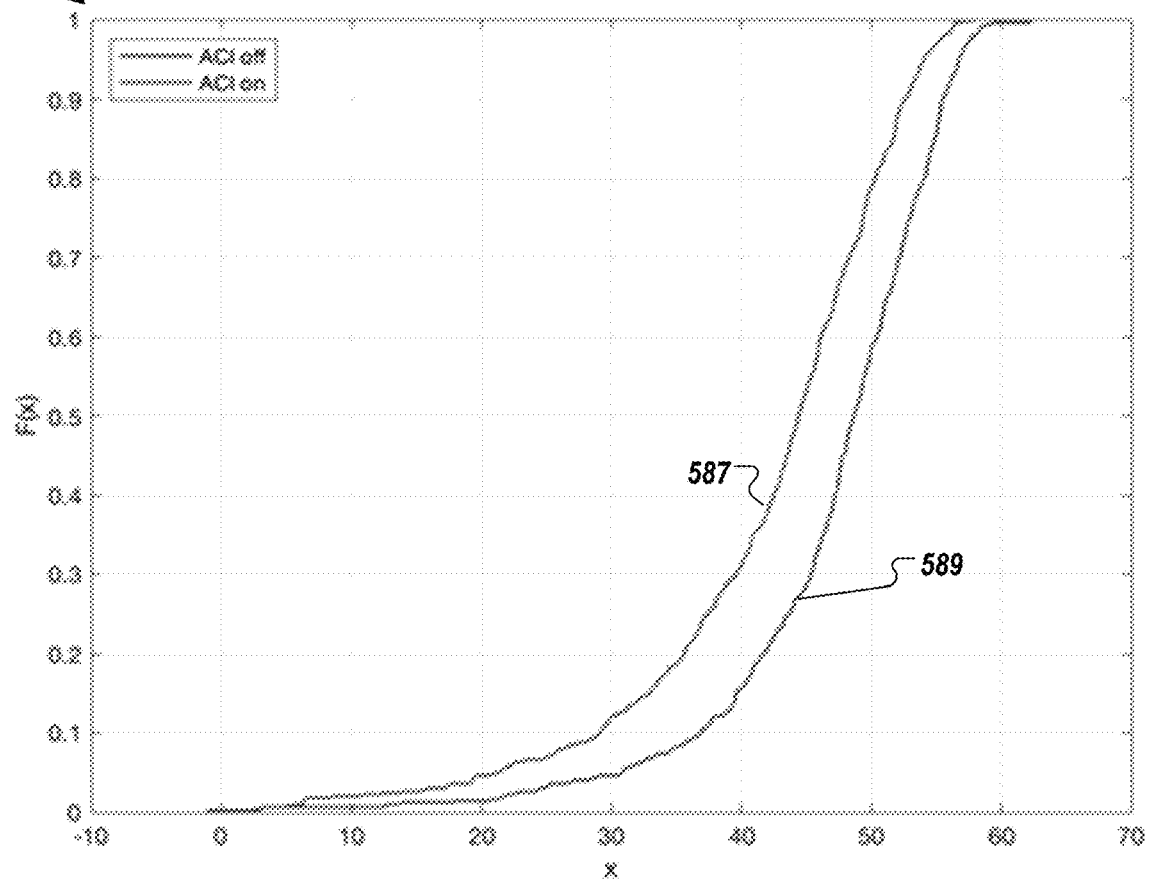
FIG. 5K is a CDF graph showing corrected CSI data with an ACI filter activated and CSI data with the ACI filter de-activated for the second channel subcarrier, according to at least one embodiment.

FIG. 5K is a CDF graph 585 showing corrected CSI data with an ACI filter activated 587 and CSI data with the ACI filter de-activated 589 for the second channel subcarrier, according to at least one embodiment. The CDF of the raw CSI data for subcarrier 15 is shown in FIG. 5K.

The processing logic can rank each subcarrier index from a minimum test score to a maximum test score based on the Cramer-von Mises criterion. For example, in the two illustrated examples, the subcarrier 3 has a test score of 0.19, and the subcarrier 15 has a test score of 7.8696. The lower test score represents a closer fit between the two data curves as described herein. Once ranked, the processing logic can select a subset of indexes having higher test scores than corresponding scores of other indexes in the set. For example, the top-five ranked subcarrier indexes can be used for motion detection.

Figure 6:
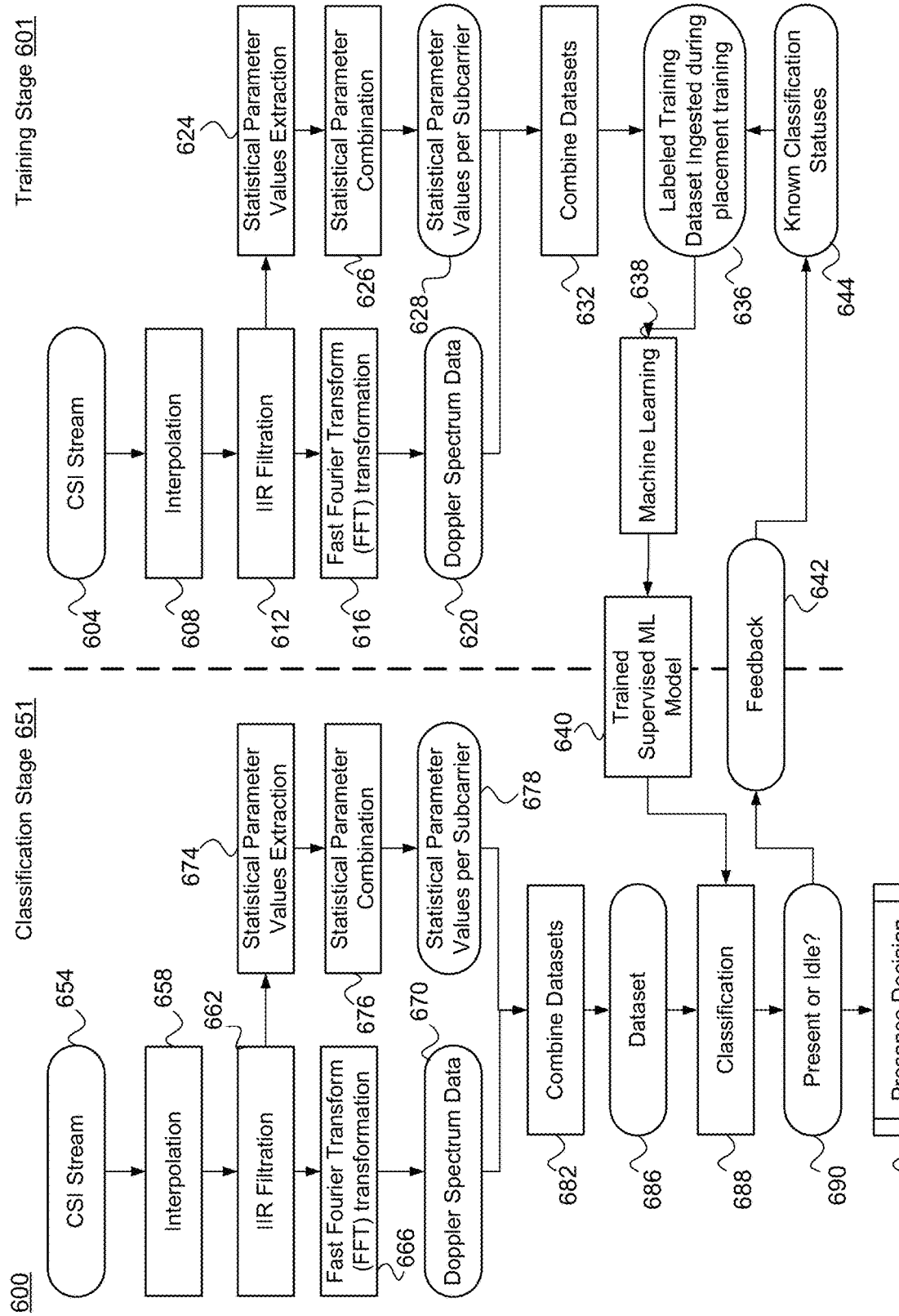
FIG. 6 is a flow diagram of a method including a training stage and a classification stage to train a supervised machine learning (ML) model and apply the trained ML model to classify pre-processed data to perform presence detection according to various embodiments.

FIG. 6 is a flow diagram of a method 600 including a training stage 601 and a classification stage 651 to train a supervised machine learning (ML) model and apply the trained ML model to classify pre-processed data to perform presence detection, according to various embodiments. Method 600 may be performed by processing logic that may comprise hardware (e.g., circuitry, dedicated logic, programmable logic, microcode, etc.), software (such as instructions running on the processor), firmware, or a combination thereof. In one embodiment, a processor of the wireless detector 104, the computing device 150, or the wireless device 120 performs the method 600. Alternatively, other components of a disclosed device may perform some or all of the operations of the method 600.

With further reference to FIG. 6, the method 600 may begin with the processing logic, within the training stage 601, receiving initial data indicative of channel properties of a communication link between a wireless receiver (e.g., in the wireless detector 104) and a wireless transmitter (e.g., in the AP device 110) (block 604). In one embodiment, the initial data is a CSI stream, but RSSI data may also be included. The initial data may be captured from a room within a building during an initial training phase used to train the supervised ML model 158 before employing the supervised ML model for presence and motion detections.

The method 600 may continue with the processing logic performing interpolation of the initial data to obtain interpolated data (block 608). The interpolated data may include equidistant data points that embody the channel properties, e.g., to provide a smoothing effect to the initial data, e.g., CSI data. The method 600 may continue with the processing logic filtering the interpolated data with an IIR filter to generate filtered data having reduced noise compared to the interpolated data (block 612). Such an IIR filter may include feedback from an output of the IIR filter, which may therefore be known as a recursive digital filter. The filtering performed by the IIR filter may further include a non-linear phase characteristic. In other embodiments, another type of filter may be used. The interpolation and the filtering at blocks 608 and 612 may be performed to generate pre-processed data, and additional pre-processing steps are envisioned.

Given a complex-numbered CSI stream $h(k, t_n)$ for $k_{th}$ subcarrier index sampled at time $t_n$, the magnitude of $h(k, t_n)$ over a time period T has N samples and can construct an $N_{sc} \times N$ matrix H.

$$H = \begin{bmatrix} |h(1, t_1)| & \cdots & |h(1, t_N)| \\ \vdots & \ddots & \vdots \\ |h(N_{sc}, t_1)| & \cdots & |h(N_{sc}, t_N)| \end{bmatrix} \quad (3)$$

The matrix, H, of Equation (3) may include the interpolated and filtered data spanning various data points over time for the $k_t$h subcarrier index.

With continued reference to FIG. 6, the method 600 may continue with the processing logic executing an FFT on the pre-processed data to generate a data stream in the frequency domain, e.g., that contains frequency domain information of the pre-processed data (block 616). The FFT is a discrete Fourier transform algorithm that reduces the number of computations needed for N points from $2N^2$ to $2N\lg N$, where lg is the base-2 logarithm. In one embodiment, a one-dimensional FFT with $N_{fft}$ points may be applied to each row of the matrix of Equation (3) to result in the following Doppler spectrum matrix, $H_{freq}$, given as Equation (4).

$$H_{freq} = \begin{bmatrix} |\tilde{h}(1, f_0)| & \cdots & |\tilde{h}(1, f_{N_{fft}-1})| \\ \vdots & \ddots & \vdots \\ |\tilde{h}(N_{sc}, f_0)| & \cdots & |\tilde{h}(N_{sc}, f_{N_{fft}-1})| \end{bmatrix} \quad (4)$$

where $\tilde{h}(k, f_n)$ is the $n_{th}$ frequency component for $k_{th}$ subcarrier index after FFT.

The data within the Doppler spectrum matrix may therefore be indicative of shifts in incoming received waves over a multipath channel. These shifts in turn indicate the movement of an object (e.g., a human) across time and space. For example, the $n^{th}$ reflected wave with amplitude ($c_n$) and phase ($\phi_n$) arrive from an angle ($\alpha_n$) relative to the direction of movement of the human. The Doppler shift of this wave may be expressed as:

$$\Delta f_n = \frac{\upsilon}{\lambda} \cos \alpha_n \tag{7}$$

where $\upsilon$ is the speed of the human that is moving. The data points within the Doppler spectrum matrix may therefore include the information for determining human presence based on reflected wireless signals from a moving human.

The method 600 may continue with the processing logic extracting frequency components from the data stream in the frequency domain, e.g., the Doppler spectrum matrix, $H_{freq}$, which are indicative of the movement of a human, to generate Doppler spectrum data (block 620). For example, in one embodiment, the frequency components of DC and above 30 Hz may be dropped out to reduce the size of an input feature vector (discussed below) as only motion is useful info for classification. Then the matrix values may be stacked into a one-dimensional vector as illustrated in Equation (5).

$$Y_{freq}=[|H(1,f_1)| \ldots |h(1,f_{30 \ Hz})| \ldots |h(N_{sc},f_1)| \ldots |h(N_{sc},f_{Nfft})|] \tag{5}$$

Additional reference will be made to this one-dimensional vector later.

With continued reference to FIG. 6, the method 600 may continue with the processing logic extracting statistical parameter values from the filtered data for the subcarrier over a time period and within the time domain (block 624). The statistical parameter values may include one or more of a maximum value, a minimum value, a mean value, a variance value, an entropy value, a mean cross rate value, a skewness value, or a kurtosis value, each of which is defined in more detail below. The method 600 may continue with the processing logic combining these statistical parameter values into a second one-dimensional vector (block 626) to generate a combined vector of the statistical parameter values for each subcarrier (block 628). In another embodiment, the method 600 generates statistical parameter values of the FFT results at block 616 or block 620.

The statistical parameter values may be useable as feature values to define the supervised ML model 158, particularly in the case of an SVM model. More specifically, by combining the time-domain-based statistical parameter values as features, a machine learning classifier may more accurately separate new testing data in a hyper-dimensional plane. If the regularization technique is utilized to generate an SVM machine learning model, the contribution or weighting of these features may be emphasized or de-emphasized with hyper-parameters (e.g., statistical parameters per hyperplane for each subcarrier) to avoid the overfitting in the optimization process upon application of the supervised ML model 158. Similarly, by combining the frequency-domain-based statistical parameter values as features, the machine learning classifier can be more accurate and separate new testing data in a hyper-dimensional plane.

In various embodiments, the maximum and minimum values per subcarrier may be the maximum and minimum value of the magnitude of complex CSI h(k, $t_n$) over a time period T The mean value of h(k, $t_n$) per subcarrier over a time period T may be defined as Equation (6):

$$\mu(k) = \frac{1}{N} \sum_{t_n \in T} |h(k, t_n)| \tag{7}$$

In one embodiment, the variance value per subcarrier may be defined as $$var(k) = \frac{1}{N-1} \sum_{N} [|h(k, t_n)| - \mu]^2 \tag{8}$$

where there are N samples for the time period T.

The magnitude of h(k, $t_n$) over a time period T may have N samples and can construct an $N_{sc} \times N$ matrix H like a two-dimensional image, given in Equation (9).

$$H = \begin{bmatrix} |h(1, t_1)| & \ldots & |h(1, t_N)| \\ \vdots & \ddots & \vdots \\ |h(N_{sc}, t_1)| & \ldots & |h(N_{sc}, t_N)| \end{bmatrix} \tag{9}$$

From the matrix, H, the processing logic may remove the stationary objects within the scene through the subtraction of the mean of the sampled time period ($H_{mean}$) and normalize the data to a grayscale image (all entries are between 0 and 1) $I_{gray}$.

In one embodiment, the processing logic CSI entropy value may be computed with the formula of the image entropy $$\text{Entrophy} = - \sum_{All(m,n)} I_{gray}(m, n) * \log_2(I_{gray}(m, n)) \tag{10}$$

where (m,n) is the entry of the $m_{th}$ row and $n_{th}$ column of the grayscale image. Mean cross rate value per subcarrier may count the number of crossings (in the positive direction) of h(k, $t_n$) through the mean valued µ for the specified time period, T.

Skewness is a measure of the asymmetry of the data around the sample mean. If skewness is negative, the data are spread out more to the left of the mean than to the right. If skewness is positive, the data are spread out more to the right. The skewness value of the normal distribution (or any perfectly symmetric distribution) is zero.

In one embodiment, therefore, the skewness feature per subcarrier may be defined as expressed in Equation (11).

$$s(k) = \frac{\frac{1}{N} \sum_{N} [|h(k, t_n)| - \mu]^3}{\left\{ \sqrt{\frac{1}{N} \sum_{N} [|h(k, t_n)| - \mu]^2} \right\}^3} \tag{11}$$

Kurtosis is a measure of how outlier-prone a distribution is of a dataset. The kurtosis value of the normal distribution is three. Distributions that are more outlier-prone than the normal distribution have a kurtosis value greater than three, e.g., distributions that are less outlier-prone have kurtosis values less than three. Kurtosis may be expressed by the following Equation (12).

$$Kr(k) = \frac{\frac{1}{N}\sum_{N}[|h(k,t_n)|-\mu]^4}{\left\{\frac{1}{N}\sum_{N}[|h(k,t_n)|-\mu]^2\right\}^2} \quad (12)$$

With continued reference to FIG. 6, the method 600 may continue with the processing logic combining (e.g., stacking) the feature values (within the second vector) with the Doppler spectrum data (within the first vector) within a one-dimensional (1D) resultant vector, e.g., one-dimensional vector (block 632). The method 600 may continue with the processing logic labeling the data points within the 1D resultant vector with known classification statuses (block 644) to generate a labeled training dataset that can be ingested during placement training as described herein (block 636). The labeled training dataset may continue to be updated through future feedback from the classification stage 651 (block 642). The method 600 may continue with the processing logic performing supervised machine learning using the labeled training dataset, to generate a trained supervised machine learning model (block 640). As explained herein, the trained supervised ML model may then be applied during classification.

In various embodiments, the training stage 601 may be performed offline, e.g., by the computing device 150 within the cloud. The method blocks 608 through 632 may be referred to as data pre-processing, e.g., the preparation of the CSI stream for machine learning according to a supervised ML model such as support vector machines (SVM) or other classification-based or regression-based learning models.

In machine learning, support vector machines (SVMs, also support vector networks) are supervised learning models with associated learning algorithms that analyze data used for classification and regression analysis. Given a set of training examples, each marked as belonging to one or the other of at least two categories, an SVM training algorithm builds a model that assigns new examples to one category or the other, making it a non-probabilistic binary linear classifier (although methods such as Platt scaling exist to use SVM in a probabilistic classification setting). An SVM model is a representation of the examples as points in space, mapped so that the examples of the separate categories are divided by a clear gap that is as wide as possible. New examples are then mapped into that same space and predicted to belong to a category based on which side of the gap they fall.

In addition to performing linear classification, SVMs may efficiently perform a non-linear classification using what is called the kernel trick, implicitly mapping their inputs into high-dimensional feature spaces. When data are not labeled, supervised learning is not possible, and an unsupervised learning approach may be instead be employed, which attempts to find natural clustering of the data to groups, and then maps new data to these formed groups. The clustering algorithm that provides an improvement to the SVMs is called support vector clustering and is used in industrial applications either when data are not labeled or when only some data are labeled as a preprocessing for a classification pass.

With continued reference to FIG. 6, the method 600 may continue with the processing device, within the classification stage 651, receiving first data indicative of channel properties of a communication link between a wireless receiver (e.g., in the wireless detector 104) and a wireless transmitter (e.g., in the AP device 110) (block 654). In one embodiment, the first data is a CSI stream, but RSSI data may also be included. This "first" data may be data received in real-time and for which a presence detection is to be performed with reference to the room in the building. The method 500 may also be extended to cover additional rooms within the building. As will be apparent, the pre-processing steps within the classification stage 651 match those performed during the training stage 601; accordingly, detailed explanations will not be repeated with reference to the latter.

The method 600 may continue with the processing logic performing interpolation of the first data to obtain interpolated data (block 658). The interpolated data may include equidistant data points that embody the channel properties, e.g., to provide a smoothing effect to the first data. The method 600 may continue with the processing logic filtering the interpolated data with an infinite impulse response (IIR) filter to generate filtered data having reduced noise compared to the interpolated data (block 662).

With continued reference to FIG. 6, the method 600 may continue with the processing logic executing an FFT on the filtered data to generate a data stream in the frequency domain (block 666). The method 600 may continue with the processing logic extracting frequency components from the data stream in the frequency domain, e.g., the Doppler spectrum matrix, $H_{freq}$, which are indicative of the movement of a human, to generate Doppler spectrum data (block 670). The frequency components may include data points located between DC and approximately 30 Hz.

The method 600 may continue with the processing logic extracting statistical parameter values from the filtered data for the subcarrier over a time period and within the time domain (block 674). The statistical parameter values may include one or more of a maximum, a minimum, a mean, a variance, entropy, a mean cross rate, skewness, or kurtosis, each of which was defined above. The method 600 may continue with the processing logic combining these statistical parameter values into a one-dimensional vector (block 676) to generate a combined vector of the statistical parameter values for each subcarrier, where the statistical parameter values are useable as features values to define the supervised ML model (block 678). The method 600 may continue with the processing logic stacking the statistical parameter values with the Doppler spectrum data within a one-dimensional (1D) resultant vector, e.g., a larger one-dimensional vector containing the feature values (block 682), to generate a dataset for the supervised ML model 158 that includes both time domain and frequency domain values (block 686). For example, the method 600 may stack the variance with the Doppler spectrum according to Equation (14). Similarly, other statistical parameters from Equation (5)-(13) may be stacked to obtain a larger size feature vector for ML.

$$Y_{feature}=[|\tilde{h}(1,f_1)| \ldots |\tilde{h}(1,f_{30\ Hz})| \ldots |\tilde{h}(N_{SC},f_1)| \ldots |\tilde{h}(N_{SC},f_{Nfft})|\mathrm{var}(1) \ldots \mathrm{var}(N_{SC})]$$

$$Y_{feature}=[|\tilde{h}(1,f_1)| \ldots |\tilde{h}(1,f_{30\ Hz})| \ldots |\tilde{h}(N_{SC},f_1)| \ldots |\tilde{h}(N_{SC},f_{Nfft})|\mathrm{var}(1) \ldots \mathrm{var}(N_{SC})] \quad (14)$$

With continued reference to FIG. 6, the method 600 may continue with the processing device classifying, via execution of the trained supervised ML model (block 640), data of the dataset to distinguish the movement within the building from stationary objects (block 688), which results in a presence detection or detection of idle channels (block 690). The presence detection may be indicative of the presence of a human. In another embodiment, the results can be motion detection or non-motion detection. In one embodiment, the pre-processing of blocks 674, 676, 678, and 682 are skipped. While skipping the inclusion of time-domain statistical parameters may create a less rich dataset, such a simplified embodiment may still be employed, and thus classification may be performed on the Doppler spectrum data (instead of the dataset) using the supervised ML model.

The method 600 may continue with the processing logic outputting a presence decision with reference to at least a portion of the incoming CSI stream (block 694). In one embodiment, the presence decision is binary, e.g., "presence detected" or "presence not detected," although, in other embodiments, the decision may be indicated with a non-binary value.

In another embodiment, assuming a number of receiver-transmitter links, Nrt and a number of subcarriers, Nsc, then a CSI vector is a complex vector of length Nsc along a link between a receiver and a transmitter. Only the magnitude of the complex entries in the vector can be considered. A CSI capture is a matrix obtained by stacking the CSI vectors along all the links. Denote the ith capture by $H_i$. Then $H_i$ is a matrix of size Nsc×Nrt. Also, denote the ith CSI vector along link l by $H_{i;l}$ and the sequence of CSI vectors along link l by $H_i$. Overall, $H_{i;l}$ is a 3D tensor of size I×Nsc×Nrt.

From the sequence of CSI vectors $H_{i;l}$, the processing logic constructs a sequence of CSI frames $X_{i;l}$ by sliding a window of a fixed size and a fixed stride along the sequence of CSI vectors along each link. For example, two of the CSI frames along each link were constructed by sliding a window of size 128 and a stride of 33 on the CSI vectors. It should be noted that the ith CSI frame along link l, $X_{i;l}$ is a matrix with Nsc rows and the number of columns equal to the length of the sliding window. The (j, k)th element of this matrix is given by $X_{i;l}(j,k)$.

In at least one embodiment, the statistic parameter values used to validate a CSI frame can include the following equations for the temporal mean along the jth subcarrier (15):

$$\mu_{i,l}(j) = \frac{\sum_k X_{i,l}(j,k)}{\text{sliding window size}} \quad (15)$$

The temporal variation along the jth subcarrier (16):

$$\sigma^2_{i,l}(j) = \frac{\sum_k (X_{i,l}(j,k) - \mu_{i,l})^2}{\text{sliding window size}} \quad (16)$$

The temporal variation along the jth subcarrier (16):

$$\sigma^2_{i,l}(j) = \frac{\sum_k (X_{i,l}(j,k) - \mu_{i,l})^2}{\text{sliding window size}} \quad (16)$$

In another embodiment, the preprocessing of a CSI frame can include subcarrier spacing, subcarrier (spatial) normalization, temporal normalization, 2D FFT plus shifting and log transform, cropping the temporal dimension, and removing the first and last few columns.

Figure 7:
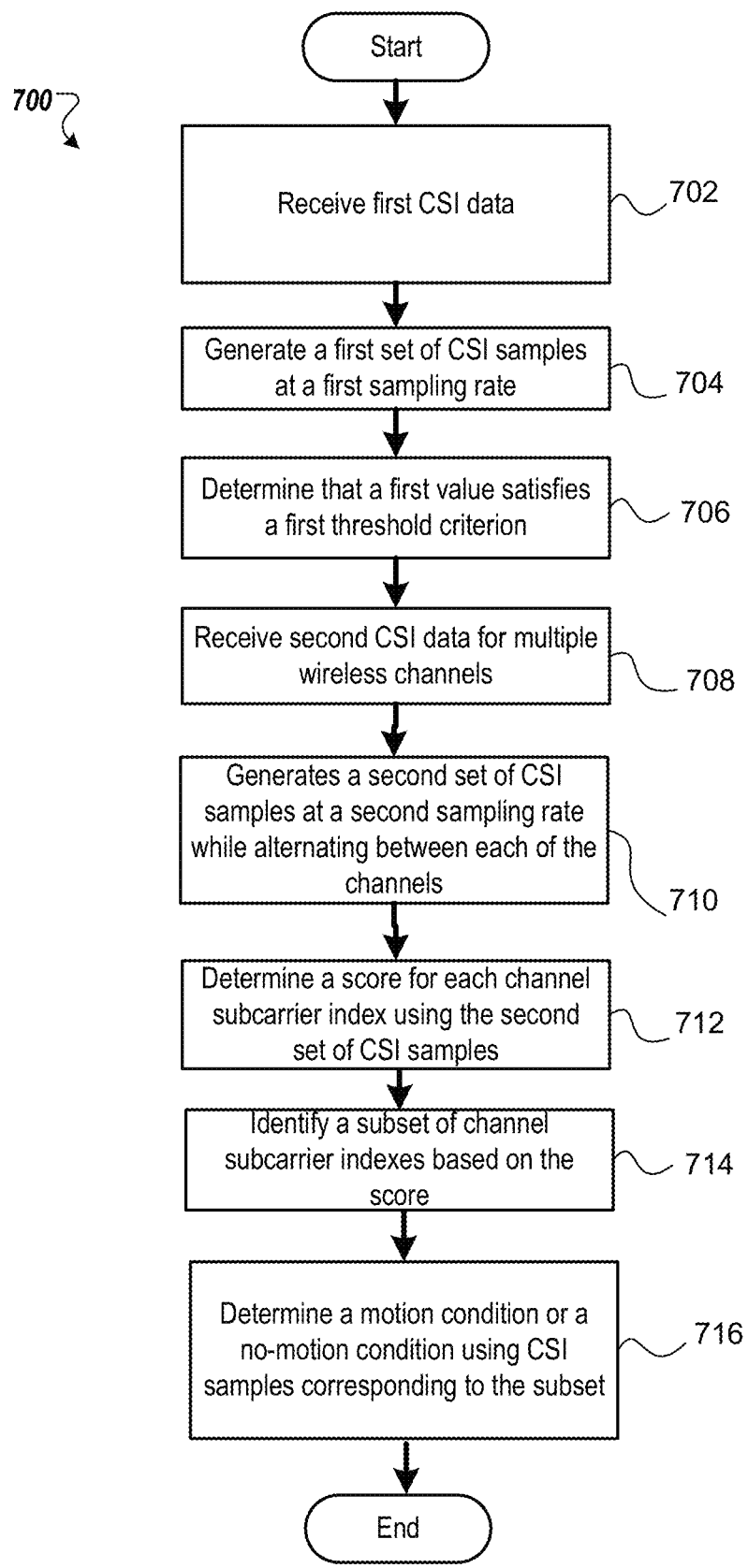
FIG. 7 is a flow diagram of a method of CSI sensing in the 2.4 GHz band, according to at least one embodiment.

FIG. 7 is a flow diagram of a method 700 for CSI sensing in the 2.4 GHz band, according to at least one embodiment. Method 700 may be performed by processing logic that may comprise hardware (e.g., circuitry, dedicated logic, programmable logic, microcode, etc.), software (such as instructions running on the processor), firmware, or a combination thereof. In one embodiment, a processor of the wireless detector 104, the computing device 150, or the wireless device 120 performs the method 700. Alternatively, other components of a disclosed device may perform some or all of the operations of the method 700.

With further reference to FIG. 7, the method 700 may begin with the processing logic receiving first CSI data representing channel properties of a wireless channel used by a first wireless device and a second wireless device (block 702). The first and second wireless devices operate in a 2.4 GHz band. The processing logic generates a first set of CSI samples by sampling the first CSI data at a first sampling rate corresponding to a specified amount of time (block 702). The processing logic determines that a first value, representing a quality metric of the first set of CSI samples, satisfies a first threshold criterion (block 706). In response to determining that the first value satisfies the first threshold criterion, the processing logic receives second CSI data representing channel properties of multiple wireless channels between the first wireless device and the second wireless device; (block 708). The processing logic generates a second set of CSI samples by sampling the second CSI data at a second sampling rate higher than the first sampling rate while alternating between each of the multiple wireless channels in the specified amount of time (block 710). The processing logic determines a score for each channel subcarrier index of a set of channel subcarrier indexes using the second set of CSI samples (block 712). The processing logic identifies a subset of channel subcarrier indexes from the set of channel subcarrier based on the score (block 714). The processing logic determines a motion condition or a no-motion condition within a geographical region using the CSI samples corresponding to the subset of channel subcarrier indexes (block 716), and the method 700 ends.

In a further embodiment, the processing logic determines the score based on a second value representing an average fading power of the respective channel subcarrier index and a third value representing a variance of the respective channel subcarrier index. In another embodiment, the processing logic calculates a first parameter value. The first parameter value is at least one of a mean, an FFT mean, a standard deviation, or an FFT standard deviation. The processing logic determines the score based on the first parameter value. In another embodiment, the processing logic determines the score based on other combinations of one or more parameter values. The processing logic identifies the subset by identifying the subset of channel subcarrier indexes having a higher score than corresponding scores of other channel subcarrier indexes in the set.

In another embodiment, the processing logic process the second set of CSI samples to replace outlier samples, remove a trend, and remove higher-frequency noise components from the second set of CSI samples. In another embodiment, the second set of CSI samples includes a first set of samples obtained when an ACI filter is activated and a second set of samples obtained when the ACI filter is de-activated. The processing logic determines the scores using the Cramer-von Mises criterion between the first and second sets of samples. The processing logic identifies the subset by identifying the subset of channel subcarrier indexes having a lower score than corresponding scores of other channel subcarrier indexes in the set. In another embodiment, the processing logic processes the first set of samples to replace outlier samples, remove a trend, and remove higher-frequency noise components from the first set of samples and processes the second set of samples to replace outlier samples, remove a trend, and remove higher-frequency noise components from the second set of samples.

In at least one embodiment, the first value is a quality metric. The quality metric can be a packet drop rate, an error rate, or the like. The first threshold criterion can be a specified threshold value representing an unacceptable packet drop rate for the wireless channel.

In at least one embodiment, the multiple wireless channels can include a first channel, a second channel, and a third channel. In at least one embodiment, the first, second, and third channels are non-overlapping in frequency. In at least one embodiment, at least one or more channels overlap in frequency.

In at least one embodiment, the processing logic processes the second set of CSI samples to replace outlier samples with a median absolute deviation of a moving window-based filter. In at least one embodiment, the processing logic processes the second set of CSI samples to remove a trend in the second set of CSI samples by offsetting the second set of CSI samples by a mean value. In at least one embodiment, the processing logic processes the second set of CSI samples to de-noise the second set of CSI samples using a wavelet transform that removes higher-frequency noise components in the second set of CSI samples.

In another embodiment, the processing logic receives third CSI data representing channel properties of the wireless channel between the first wireless device and the second wireless device. The processing logic determines that a size of the third CSI data does not satisfy a second threshold criterion or the third CSI data is not received in a specified time interval. In response to determining that the size does not satisfy the second threshold criterion or the third CSI data is not received in the specified time interval, the processing logic obtains a third set of CSI samples when an ACI filter is activated (based on a first indication) and obtains a fourth set of CSI samples when the ACI filter is de-activated (based on a second indication). The processing logic determines a score for each channel subcarrier index of the set of channel subcarrier indexes using a Cramer-von Mises criterion between the third and fourth sets of CSI samples. The processing logic identifies a subset of a specified number of channel subcarrier indexes in the set of channel subcarrier indexes having a lower ranking than corresponding rankings of other channel subcarrier indexes in the set. The processing logic determines a second motion condition or a second no-motion condition within the home using the CSI samples corresponding to the subset of the specified number of channel subcarrier indexes. In a further embodiment, the processing logic processes the third set of CSI samples to replace outlier samples, remove a trend, and remove higher-frequency noise components from the third set of CSI samples and processes the fourth set of CSI samples to replace outlier samples, remove a trend, and remove higher-frequency noise components from the fourth set of CSI samples.

In at least one embodiment, the processing logic receives third CSI data representing channel properties of the wireless channel between the first wireless device and the second wireless device. The processing logic generates a third set of CSI samples by sampling the third CSI data at the first sampling rate corresponding to the specified amount of time. The processing logic determines that a fourth value, representing a quality metric of the third set of CSI samples, does not satisfy the first threshold criterion. The processing logic determines that a size of the third CSI data satisfies the second threshold criterion or the third CSI data is received in the specified time interval. In response to determining that i) the fourth value does not satisfy the first threshold criterion, and ii) the size satisfies the second threshold criterion or the third CSI data is received in the specified time interval, the processing logic determines a second motion condition or a second no-motion condition within the home using the third set of CSI samples.

In another embodiment, the processing logic receives third CSI data representing channel properties of the wireless channel between the first wireless device and the second wireless device. The processing logic generates a third set of CSI samples by sampling the third CSI data at the first sampling rate corresponding to the specified amount of time. The processing logic determines that a fourth value, representing a quality metric of the third set of CSI samples, does not satisfy the first threshold criterion. The processing logic determines that a size of the third CSI data does not satisfy the second threshold criterion or the third CSI data is not received in the specified time interval. In response to determining that i) the fourth value does not satisfy the first threshold criterion, and ii) the size does not satisfy the second threshold criterion, or the third CSI data is not received in the specified time interval, the processing logic obtains a third set of CSI samples when an ACI filter is activated (based on a first indication) and a fourth set of CSI samples when the ACI filter is de-activated (based on a second indication). The processing logic determines a score for each channel subcarrier index of the set of channel subcarrier indexes using a Cramer-von Mises criterion between the third and fourth sets of CSI samples. The processing logic identifies a subset of a specified number of channel subcarrier indexes in the set of channel subcarrier indexes having a lower ranking than corresponding rankings of other channel subcarrier indexes in the set. The processing logic determines a second motion condition or a second no-motion condition within the home using the CSI samples corresponding to the subset of the specified number of channel subcarrier indexes. In a further embodiment, the processing logic processes the third set of CSI samples to replace outlier samples, remove a trend, and remove higher-frequency noise components from the third set of CSI samples and processes the fourth set of CSI samples to replace outlier samples, remove a trend, and remove higher-frequency noise components from the fourth set of CSI samples.

Figure 8:
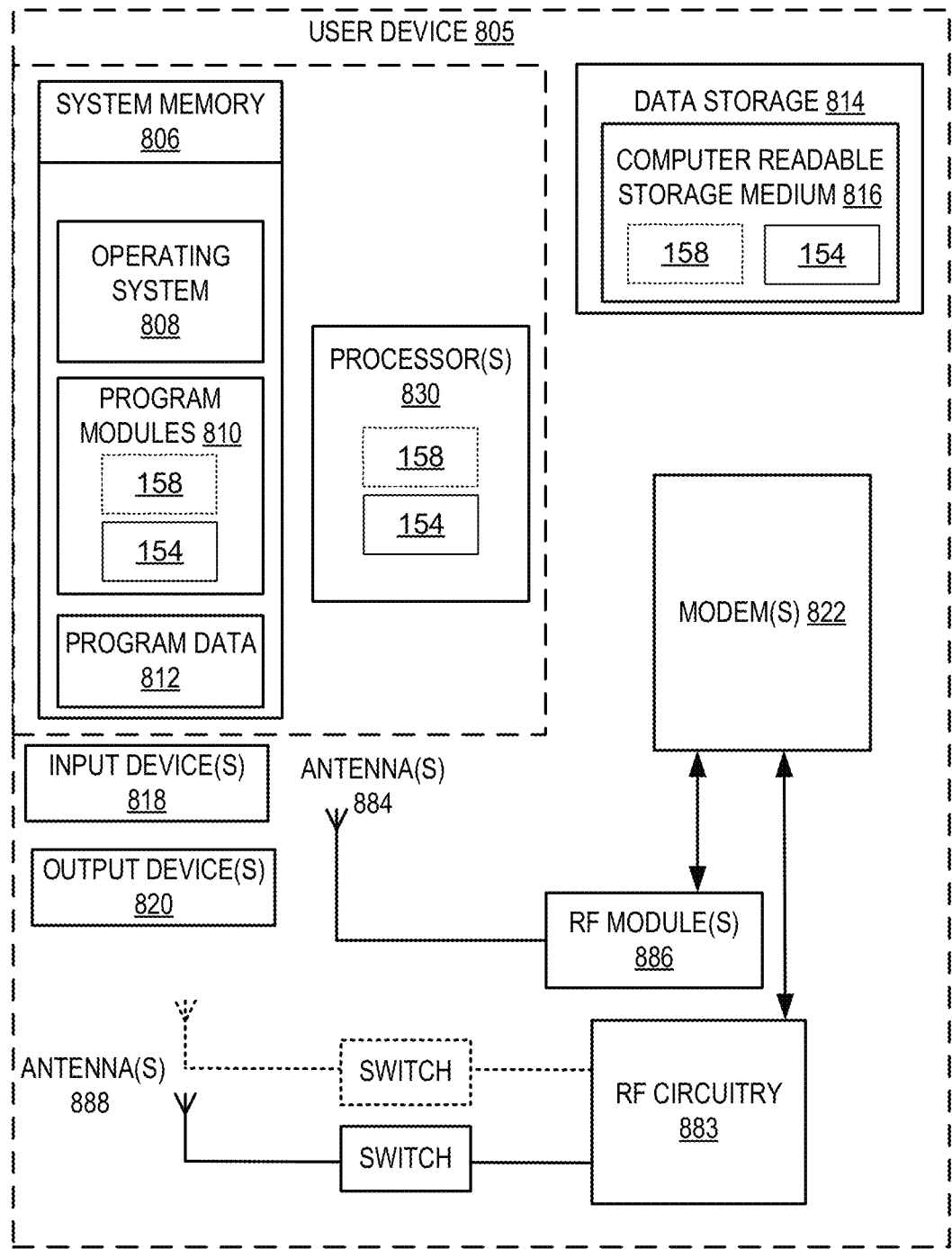
FIG. 8 is a block diagram of a user device that may implement embodiments of the 2.4 GHz CSI sensing engine.

FIG. 8 is a block diagram of a user device 805 in which embodiments of the 2.4 GHz CSI sensing engine 154 may be implemented. The user device 805 may correspond to the wireless detector 104, the access point device 110, or the wireless device 120 of FIG. 1C. The user device 805 may be any type of computing devices such as an electronic book reader, a PDA, a mobile phone, a laptop computer, a portable media player, a tablet computer, a camera, a video camera, a netbook, a desktop computer, a gaming console, a DVD player, a computing pad, a media center, and the like. The user device 805 may be any portable or stationary user device. For example, the user device 805 may be an intelligent voice control and speaker system. Alternatively, the user device 805 can be any other device used in a WLAN network (e.g., Wi-Fi® network), a WAN network, or the like.

The user device 805 includes one or more processor(s) 830, such as one or more CPUs, microcontrollers, field-programmable gate arrays, or other types of processors. The user device 805 also includes system memory 806, which may correspond to any combination of volatile and/or non-volatile storage mechanisms. The system memory 806 stores information that provides operating system component 808, various program modules 810 (e.g., the 2.4 GHz CSI sensing engine 154 and ML model 158), program data 812, and/or other components. In one embodiment, the system memory 806 stores instructions of the methods as described herein. The user device 805 performs functions by using the processor(s) 830 to execute instructions provided by the system memory 806.

The user device 805 also includes a data storage device 814 that may be composed of one or more types of removable storage and/or one or more types of non-removable storage. The data storage device 814 includes a computer-readable storage medium 816 on which is stored one or more sets of instructions embodying any of the methodologies or functions described herein. Instructions for the program modules 810 may reside, completely or at least partially, within the computer-readable storage medium 816, system memory 806 and/or within the processor(s) 830 during execution thereof by the user device 805, the system memory 806, and the processor(s) 830 also constituting computer-readable media. The user device 805 may also include one or more input devices 818 (keyboard, mouse device, specialized selection keys, etc.) and one or more output devices 820 (displays, printers, audio output mechanisms, etc.).

The user device 805 further includes a modem 822 to allow the user device 805 to communicate via a wireless network (e.g., such as provided by the wireless communication system) with other computing devices, such as remote computers, an item providing system, and so forth. The modem 822 can be connected to RF circuitry 883 and zero or more RF modules 886. The RF circuitry 883 may be a WLAN module, a WAN module, a PAN module, or the like. Antennas 888 are coupled to the RF circuitry 883, which is coupled to the modem 822. Zero or more antennas 884 can be coupled to one or more RF modules 886, which are also connected to the modem 822. The zero or more antennas 884 may be GPS antennas, NFC antennas, other WAN antennas, WLAN or PAN antennas, or the like. The modem 822 allows the user device 805 to handle both voice and non-voice communications (such as communications for text messages, multimedia messages, media downloads, web browsing, etc.) with a wireless communication system. The modem 822 may provide network connectivity using various types of mobile network technology including, for example, cellular digital packet data (CDPD), general packet radio service (GPRS), EDGE, universal mobile telecommunications system (UMTS), 1 times radio transmission technology (1xRTT), evaluation data optimized (EVDO), high-speed down-link packet access (HSDPA), Wi-Fi®, Long Term Evolution (LTE) and LTE Advanced (sometimes generally referred to as 4G), etc., although not all of these mobile network technologies may be available.

The modem 822 may generate signals and send these signals to antenna 888, and 884 via RF circuitry 883, and RF module(s) 886 as described herein. User device 805 may additionally include a WLAN module, a GPS receiver, a PAN transceiver and/or other RF modules. These RF modules may additionally or alternatively be connected to one or more of antennas 884, 888. Antennas 884, 888 may be configured to transmit in different frequency bands and/or using different wireless communication protocols. The antennas 884, 888 may be directional, omnidirectional, or non-directional antennas. In addition to sending data, antennas 884, 888 may also receive data, which is sent to appropriate RF modules connected to the antennas.

In one embodiment, the user device 805 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one embodiment, the first wireless connection is associated with a first resonant mode of an antenna building that operates at a first frequency band, and the second wireless connection is associated with a second resonant mode of the antenna building that operates at a second frequency band. In another embodiment, the first wireless connection is associated with a first antenna element, and the second wireless connection is associated with a second antenna element. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a modem 822 is shown to control transmission and reception via the antenna (884, 888), the user device 805 may alternatively include multiple modems, each of which is configured to transmit/receive data via a different antenna and/or wireless transmission protocol.

The user device 805 delivers and/or receives items, upgrades, and/or other information via the network. For example, the user device 805 may download or receive items from an item-providing system. The item-providing system receives various requests, instructions, and other data from the user device 805 via the network. The item-providing system may include one or more machines (e.g., one or more server computer systems, routers, gateways, etc.) that have processing and storage capabilities to provide the above functionality. Communication between the item-providing system and the user device 805 may be enabled via any communication infrastructure. One example of such an infrastructure includes a combination of a wide area network (WAN) and wireless infrastructure, which allows a user to use the user device 805 to purchase items and consume items without being tethered to the item providing system via hardwired links. The wireless infrastructure may be provided by one or multiple wireless communications systems, such as one or more wireless communications systems. One of the wireless communication systems may be a WLAN hotspot connected with the network. The WLAN hotspots can be created by Wi-Fi® products based on IEEE 802.11x standards by Wi-Fi Alliance. Another of the wireless communication systems may be a wireless carrier system that can be implemented using various data processing equipment, communication towers, etc. Alternatively, or in addition, the wireless carrier system may rely on satellite technology to exchange information with the user device 805.

The communication infrastructure may also include a communication-enabling system that serves as an intermediary in passing information between the item-providing and the wireless communication systems. The communication-enabling system may communicate with the wireless communication system (e.g., a wireless carrier) via a dedicated channel and may communicate with the item providing system via a non-dedicated communication mechanism, e.g., a public Wide Area Network (WAN) such as the Internet.

The user devices 805 are variously configured with different functionality to enable the consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 805 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure, that embodiments may be practiced without these specific details. In some instances, well-known buildings and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required building for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method comprising:
receiving first channel state information (CSI) data representing channel properties of a wireless channel used by a first wireless device and a second wireless device located in a geographical region, wherein the first wireless device and the second wireless device operate in a 2.4 GHz band;
generating a first set of CSI samples by sampling the first CSI data at a first sampling rate corresponding to a specified amount of time;
determining that a first value, representing a quality metric of the first set of CSI samples, satisfies a first threshold criterion;
receiving second CSI data representing channel properties of a plurality of wireless channels between the first wireless device and the second wireless device;
generating a second set of CSI samples by sampling the second CSI data at a second sampling rate higher than the first sampling rate;
determining a score for each channel subcarrier index of a set of channel subcarrier indexes using the second set of CSI samples;
identifying a subset of channel subcarrier indexes from the set of channel subcarrier indexes from the set of channel subcarrier based on the score; and
determining a motion condition or a no-motion condition within the geographical region using the CSI samples corresponding to the subset of channel subcarrier indexes.

2. The method of claim 1, wherein:
determining the score for each channel subcarrier index comprises determining the score based on a second value representing an average fading power of the respective channel subcarrier index and a third value representing a variance of the respective channel subcarrier index; and identifying the subset of channel subcarrier indexes comprises identifying the subset of channel subcarrier indexes having a higher score than corresponding scores of other channel subcarrier indexes in the set.

3. The method of claim 1, further comprising calculating a first parameter value associated with each channel subcarrier index, wherein the first parameter is at least one of a mean, a Fast Fourier Transform (FFT) mean, a standard deviation, or an FFT standard deviation, wherein determining the score for each channel subcarrier index comprises determining the score based on the first parameter value.

4. The method of claim 1, further comprising adjusting one or more amplitude values in the second set of CSI samples to remove noise components outside a frequency band of interest.

5. The method of claim 1, wherein:
the second set of CSI samples comprises a first set of samples obtained based on a first indication of activation of an adjacent channel interference (ACI) filter and a second set of samples obtained based on a second indication of deactivation of the ACI filter;
determining the score for each channel subcarrier index comprises determining the score using a Cramer-von Mises criterion and the first and second sets of samples; and
identifying the subset of channel subcarrier indexes comprises identifying the subset of channel subcarrier indexes having a lower score than corresponding scores of other channel subcarrier indexes in the set.

6. The method of claim 5, further comprising:
adjusting one or more amplitude values in the first set of samples to remove noise components outside a frequency band of interest; and
adjusting one or more amplitude values in the second set of samples to remove noise components outside the frequency band of interest.

7. The method of claim 1, wherein the quality metric is a packet drop rate, and wherein the first threshold criterion is a threshold value representing an unacceptable packet drop rate for the wireless channel.

8. The method of claim 1, wherein the plurality of wireless channels comprises a first channel, a second channel, and a third channel, wherein the first, second, and third channels are non-overlapping in frequency.

9. The method of claim 1, further comprising:
receiving third CSI data representing channel properties of the wireless channel between the first wireless device and the second wireless device;
determining that a size of the third CSI data does not satisfy a second threshold criterion or the third CSI data is not received in a specified time interval;
obtaining a third set of CSI samples based on a first indication of activation of an adjacent channel interference (ACI) filter;
obtaining a fourth set of CSI samples based on a second indication of deactivation of an the ACI filter;
determining a score for each channel subcarrier index of the set of channel subcarrier indexes using a Cramer-von Mises criterion and the third and fourth sets of CSI samples;
identifying a subset of a first number of channel subcarrier indexes in the set of channel subcarrier indexes having a lower score than corresponding scores of other channel subcarrier indexes in the set; and
determining a second motion condition or a second no-motion condition within the geographical region using the CSI samples corresponding to the subset of the specified number of channel subcarrier indexes.

10. The method of claim 1, further comprising:
receiving third CSI data representing channel properties of the wireless channel between the first wireless device and the second wireless device;
generating a third set of CSI samples by sampling the third CSI data at the first sampling rate corresponding to the specified amount of time;
determining that a fourth value, representing a quality metric of the third set of CSI samples, does not satisfy the first threshold criterion;
determining that a size of the third CSI data satisfies the second threshold criterion or the third CSI data is received in a specified time interval; and
determining a second motion condition or a second no-motion condition within the geographical region using the third set of CSI samples.

11. The method of claim 1, further comprising:
receiving third CSI data representing channel properties of the wireless channel between the first wireless device and the second wireless device;
generating a third set of CSI samples by sampling the third CSI data at the first sampling rate corresponding to the specified amount of time;
determining that a fourth value, representing a quality metric of the third set of CSI samples, does not satisfy the first threshold criterion;
determining that a size of the third CSI data does not satisfy the second threshold criterion or the third CSI data is not received in the specified time interval;
obtaining a third set of CSI samples based on a first indication of activation of an adjacent channel interference (ACI) filter;
obtaining a fourth set of CSI samples based on a second indication of deactivation of the ACI filter;
determining a score for each channel subcarrier index of the set of channel subcarrier indexes using a Cramer-von Mises criterion and the third and fourth sets of CSI samples;
identifying a subset of a specified number of channel subcarrier indexes in the set of channel subcarrier indexes having a lower score than corresponding scores of other channel subcarrier indexes in the set; and
determining a second motion condition or a second no-motion condition within the geographical region using the CSI samples corresponding to the subset of the specified number of channel subcarrier indexes.

12. A first wireless device comprising:
a memory device that stores instructions; and
a processing device, operatively coupled to the memory device, executes the instructions to perform operations comprising:
receiving first channel state information (CSI) data representing channel properties of a wireless channel used by the first wireless device and a second wireless device located in a geographical region, wherein the first wireless device and the second wireless device operate in a 2.4 GHz band;
generating a first set of CSI samples by sampling the first CSI data at a first sampling rate corresponding to a specified amount of time;
determining that a first value, representing a quality metric of the first set of CSI samples, satisfies a first threshold criterion;

receiving second CSI data representing channel properties of a plurality of wireless channels between the first wireless device and the second wireless device;

generating a second set of CSI samples by sampling the second CSI data at a second sampling rate higher than the first sampling rate while alternating between each of the plurality of wireless channels in the specified amount of time;

determining a score for each channel subcarrier index of a set of channel subcarrier indexes using the second set of CSI samples;

identifying a subset of channel subcarrier indexes from the set of channel subcarrier indexes from the set of channel subcarrier based on the score; and determining a motion condition or a no-motion condition within the geographical region, where the first and second wireless devices are located, using the CSI samples corresponding to the subset of channel subcarrier indexes.

13. The first wireless device of claim 12, wherein the operations further comprise:
determining the score for each channel subcarrier index comprises determining the score based on a second value representing average fading power of the plurality of wireless channels and a third value representing a variance of the plurality of wireless channels; and identifying the subset of channel subcarrier indexes comprises identifying the subset of channel subcarrier indexes having a higher score than corresponding scores of other channel subcarrier indexes in the set.

14. The first wireless device of claim 12, wherein the operations further comprise calculating a first parameter value associated with each channel subcarrier index, wherein the first parameter is at least one of a mean, a Fast Fourier Transform (FFT) mean, a standard deviation, or an FFT standard deviation, wherein determining the score for each channel subcarrier index comprises determining the score based on the first parameter value.

15. The first wireless device of claim 12, wherein:
the second set of CSI samples comprise a first set of samples obtained based on a first indication of activation of an adjacent channel interference (ACI) filter and a second set of samples obtained based on a second indication of deactivation of the ACI filter;

the score for each channel subcarrier index is determined using a Cramer-von Mises criterion and the first and second sets of samples; and the subset of channel subcarrier indexes have a lower score than corresponding scores of other channel subcarrier indexes in the set.

16. The first wireless device of claim 12, wherein the quality metric is a packet drop rate, and wherein the first threshold criterion is a threshold value representing an unacceptable packet drop rate for the wireless channel.

17. The first wireless device of claim 12, wherein the plurality of wireless channels comprises a first channel, a second channel, and a third channel, wherein the first, second, and third channels are non-overlapping in frequency.

18. A method comprising:
receiving first channel state information (CSI) data representing channel properties of a wireless channel used by a first wireless device and a second wireless device located in a geographical region, wherein the first wireless device and the second wireless device operate in a 2.4 GHz band;

determining that a size of the first CSI data does not satisfy a second threshold criterion or the first CSI data is not received in a specified time interval;

obtaining a first set of CSI samples based on a first indication of activation of an adjacent channel interference (ACI) filter;

obtaining a second set of CSI samples based on a second indication of deactivation of an the ACI filter;

determining a score for each channel subcarrier index of a set of channel subcarrier indexes using a Cramer-von Mises criterion and the first and second sets of CSI samples;

identifying a subset of a first number of channel subcarrier indexes in the set of channel subcarrier indexes having a lower score than corresponding scores of other channel subcarrier indexes in the set; and determining a second motion condition or a second no-motion condition within the geographical region using the CSI samples corresponding to the subset of the specified number of channel subcarrier indexes.

19. The method of claim 18, further comprising:
receiving second CSI data representing channel properties of a wireless channel between the first wireless device and the second wireless device;

generating a third set of CSI samples by sampling the second CSI data at a first sampling rate corresponding to a specified amount of time;

determining that a first value, representing a quality metric of the third set of CSI samples, does not satisfy a first threshold criterion;

determining that a size of the second CSI data satisfies a second threshold criterion or the second CSI data is received in a specified time interval; and determining a second motion condition or a second no-motion condition within the geographical region using the third set of CSI samples.

20. The method of claim 18, further comprising:
receiving second CSI data representing channel properties of a wireless channel between the first wireless device and the second wireless device;

generating a third set of CSI samples by sampling the second CSI data at a first sampling rate corresponding to a specified amount of time;

determining that a first value, representing a quality metric of the third set of CSI samples, does not satisfy a first threshold criterion; and determining that a size of the second CSI data does not satisfy a second threshold criterion or the second CSI data is not received in a specified time interval.

* * * * *